(12) United States Patent
Usami et al.

(10) Patent No.: US 6,407,758 B1
(45) Date of Patent: Jun. 18, 2002

(54) SCREEN FORMING EDITOR

(75) Inventors: Tetsuyuki Usami; Narihiro Akatsuka, both of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/341,885

(22) PCT Filed: Nov. 19, 1998

(86) PCT No.: PCT/JP98/05206

§ 371 (c)(1),
(2), (4) Date: Sep. 10, 1999

(87) PCT Pub. No.: WO99/27438

PCT Pub. Date: Jun. 3, 1999

(30) Foreign Application Priority Data

Nov. 20, 1997 (JP) .............................................. 9-319525

(51) Int. Cl.[7] .............................................. G06T 11/00
(52) U.S. Cl. ........................................ 345/778; 345/783
(58) Field of Search ................................ 345/778, 783, 345/780, 779, 788, 802, 805, 747, 746, 744, 762, 689; 707/10; 709/230, 232

(56) References Cited

U.S. PATENT DOCUMENTS

| 5,086,513 A | * | 2/1992 | Lawrence et al. | 455/186 |
|---|---|---|---|---|
| 5,182,796 A | * | 1/1993 | Shibayama et al. | 345/778 |
| 5,289,574 A | * | 2/1994 | Sawyer | 345/778 |
| 5,335,320 A | * | 8/1994 | Iwata et al. | 345/762 |
| 5,499,334 A | * | 3/1996 | Staab | 345/778 |
| 5,553,216 A | * | 9/1996 | Yoshioka et al. | 395/116 |
| 5,564,002 A | * | 10/1996 | Brown | 345/778 |
| 5,617,522 A |   | 4/1997 | Peltier |   |
| 5,627,948 A | * | 5/1997 | Fukunaga | 345/783 |
| 5,675,752 A |   | 10/1997 | Scott et al. |   |
| 5,712,964 A | * | 1/1998 | Kamada et al. | 345/778 |
| 5,737,556 A | * | 4/1998 | Yasunaga | 345/783 |
| 5,742,285 A | * | 4/1998 | Ueda | 345/778 |
| 6,148,140 A | * | 11/2000 | Okada et al. | 386/105 |

FOREIGN PATENT DOCUMENTS

| JP | SHO 62-186365 | 8/1987 |
|---|---|---|
| JP | 4-181455 | 6/1992 |
| JP | 4-280321 | 10/1992 |
| JP | 5-216641 | 8/1993 |
| JP | 5-233258 | 9/1993 |

(List continued on next page.)

OTHER PUBLICATIONS

Tomonari Kamiba et al, "U–face: a User Interface Design Tool Based on Multiview Model", Information Process Society, vol. 34, No. 1, pp. 167–176, Jan. 1993.

Toshiyuki Obi, et al, "Systems Engineer Support system for Social Information Systems", Toshiba Review, vol. 51, No. 5, pp. 59–62, May 1996.

*Primary Examiner*—Steven Sax
(74) *Attorney, Agent, or Firm*—Sughrue Mion, PLLC

(57) ABSTRACT

The screen editor 31 according to the present invention can edit the screens and provide display control over a display unit 2 capable of switching the displayed screens through an operation from an input device such as a touch switch 9. More specifically, a screen shift editing unit 32 creates a screen shift chart through operation by a person, and further prepares screen switching information for shifting a screen according to this screen shift chart, and automatically sets a touch switch for selecting a screen to be switched (a screen to be displayed next) in the screen. Also, the screen shift editing section 32 automatically creates a screen shift chart by utilizing the previously prepared screen information data. Further the screen shift editing section 32 automatically corrects, when an unwanted screen is deleted or when a target screen for shifting is changed, the screen information data of the screen related thereto.

7 Claims, 23 Drawing Sheets

EMBODIMENT OF THE SCREEN EDITOR ACCORDING TO THE PRESENT INVENTION

FOREIGN PATENT DOCUMENTS

| | | |
|---|---|---|
| JP | HEI 5-257670 | 10/1993 |
| JP | 06035684 | 2/1994 |
| JP | 06282426 | 10/1994 |
| JP | 06332686 | 12/1994 |
| JP | 07098737 | 4/1995 |
| JP | 07219754 | 8/1995 |
| JP | 08278881 | 10/1996 |
| JP | 09016384 | 1/1997 |
| JP | 09062469 | 3/1997 |
| JP | 09081373 | 3/1997 |

* cited by examiner

SYSTEM CONFIGURATION SHOWING POSITIONAL RELATION OF THE SCREEN EDITOR ACCORDING TO THE PRESENT INVENTION

EXAMPLE OF A SCREEN DISPLAYED ON THE DISPLAY UNIT

FLOWCHART OF SCREEN SWITCHING PROCESS

FIG.5

| |  |
|---|---|
| DATA TYPE | ~21 |
| ID (SERIAL NUMBER) | ~22 |
| PHYSICAL KEY INFORMATION | ~23 |
| SCREEN IDENTIFIER OF A TARGET SCREEN FOR SWITCHING | ~24 |
| ADDRESS FOR A SWITCHING CONDITION | ~25 |
| SWITCHING CONDITION | ~26 |
| DISPLAYED GRAPHICS INFORMATION | ~27 |
| OTHER INFORMATION | ~28 |

TOUCH SWITCH INFORMATION

SYMBOLS USABLE IN THE SCREEN SHIFT CHART

FIRST EXAMPLE OF THE SCREEN SHIFT CHART

FLOWCHART OF AUTOMATIC SETTING PROCESS OF SCREEN SWITCHING INFORMATION

OUTLINES OF SCREENS EDITED AND
DISPLAYED ACCORDING TO FIG.8

SECOND EXAMPLE OF THE SCREEN SHIFT CHART

OUTLINE OF A SCREEN EDITED AND DISPLAYED
ACCORDING TO FIG.11

OUTLINE OF A SCREEN EDITED AND DISPLAYED
ACCORDING TO FIG.11

THIRD EXAMPLE OF THE SCREEN SHIFT CHART

FLOWCHART OF AUTMATIC SETTING PROCESS OF SCREEN SWITCHING INFORMATION

OUTLINE OF A SCREEN EDITED AND DISPLAYED ACCORDING TO FIG.14

FOURTH EXAMPLE OF THE SCREEN SHIFT CHART

FLOWCHART OF A PROCESS FOR SETTING A TOUCH SWITCH WHEN A CONDITION IS SET FOR SCREEN SWITCHING

OUTLINE OF A SCREEN EDITED AND DISPLAYED ACCORDING
TO FIG.17

FLOWCHART OF A PROCESS FOR CREATING A SCREEN SHIFT CHART

STRUCTURE OF SCREEN INFORMATION DATA

STRUCTURE OF DETAILS DATA

LINKED DATA BETWEEN A SCREEN IDENTIFIER IN THE PROCESSING AND A SCREEN IDENTIFIER OF A TARGET SCREEN FOR SWITCHING

FLOWCHART OF PROCESS FOR AUTOMATIC REFLECTION
WHEN THE SCREEN SHIFT CHART IS CHANGED

| SCREEN IDENTIFIER OF TARGET SCREEN FOR SWITCHING : b |
|---|
| COMPONENT ID : 10 |

| SCREEN IDENTIFIER OF TARGET SCREEN FOR SWITCHING : c |
|---|
| COMPONENT ID : 15 |

EXAMPLE OF READ-OUT LINKED DATA

SPECIFIC STRUCTURE OF SCREEN INFORMATION DATA AND DETAILS DATA

SCREEN FORMING EDITOR

TECHNOLOGICAL FIELD

The present invention relates to a screen editor for editing and displaying screens, and more particularly to a screen editor which can edit the screen(s) and provide display control over a display unit which can display the screens while switching them from one to another.

BACKGROUND TECHNOLOGY

Conventionally, a display unit which can display the screens while switching them provides a control over the display of the screens by using an input device such as a touch switch, a mouse, a keyboard or the like. This type of display unit initially displays an initial screen such as a menu when either the power is turned on or when starting the display control. When a screen to be displayed next is selected from the menu on this initial screen then the targeted screen is displayed. Thereafter the screens are shifted to another ones when the target screens are selected by using the input device.

In the conventional type of display unit described above, if there are a plurality of choices corresponding to each screen to be displayed next, then a plurality of touch switches or a plurality of keys corresponding to each choice are displayed on the screen for selection using the input device. Namely, if there are 10 choices, then a configuration is required which provides 10 switches or keys on the screen. Further, when the screens are shifted hierarchically, a switch or a key for returning to a screen at the higher level is required in addition to a screen for switching to a screen at lower level.

Consequently, the conventional type of display unit requires to prepare screen switching information (an information regarding the selectable number of screens) for selecting a next screen for each selectable screen and to set the information to all the corresponding switches.

However, in this type of display unit, if there are a number of screens selectable as a next screen, for example 100 or more, the amount of information as the screen switching information increases. In such a case a lot of time is required for setting the switching information for all the screens. Further, management of the shifting of the screens (hereafter referred to as screen shift) becomes complicated in association with increase in the screen switching information.

Further, when an unwanted screen has been deleted or when the target screen is changed, it is necessary to correct the screen switching information set for all of the related screens. In this case, a possibility of omission of correction or improper correction due to negligence can not be neglected.

Even when there are a small number of screens, it is necessary to create a graphic or a document(s) showing the hierarchical structure in order to manage shift states of each screen. Further, when a screen is deleted or a target screen is changed, it is required to concurrently correct all the documents related to the corresponding screens as well. The processing of creating and correcting the documents is carried out by shifting the screens displayed on the display unit by operating the input device, which also requires a lot of time to be spent.

Accordingly, it is an object of the present invention to provide a screen editor which can reduce a time required for setting the screen switching information, reduce a time required for creation of documents necessary for managing the shifting of the screens, and reduce a time required for correction of documents generated when a screen is deleted or when a target screen for shifting is changed. It also an object of the present invention to provide a screen editor which can accurately manage the shifting of the screens on a display unit.

DISCLOSURE OF THE INVENTION

A screen editor according to the present invention comprises a screen editing unit (which corresponds to a screen shift editing section 32 in an embodiment described later) for creating a screen shift chart in which a screen shift state is expressed in a hierarchical format and then automatically setting a screen switching information for each screen generated according to the screen shift chart, and a screen information preparing unit (which corresponds to a screen details preparing section 33 in Embodiment described later) for preparing display information in details for each screen and component information concerning an input device, while the screen editing unit edits the screens and performs display control of the display unit according to the screen information including the screen switching information, the display information, and the component information.

The screen editor according to this invention provides controls over editing of the screens and display on the display unit capable of switching displayed screens by an operation from an input device such as a touch switch, a mouse, or a keyboard. More specifically, the screen editing unit creates a screen shift chart through operation specified by a person who wants to create a screen, the screen editing unit then prepares the screen switching information for shifting a screen according to this screen shift chart and also automatically sets a switch or switches for selecting a screen to be switched (in other words, a screen to be displayed next) in each of the screens. With this feature, even if an amount of information as the screen switching information increases in association with an increase in the number of selectable (swichable) displayed screens, because the screen editing unit automatically sets the information for each screen therein, the processing time can largely be reduced. Further, since the hierarchical structure can easily be grasped from the screen shift chart, management of shifting of screens becomes easy even if the amount of information as the screen switching information increases.

A screen editor according to another aspect of the present invention comprises a printing unit (which corresponds to a printing section 35 in the embodiment described later) for printing and outputting the screen information.

The screen editor according to this invention creates a screen shift chart (documents) which contains a hierarchical structure in order to manage the shifting states of the screens while the printing unit prints the created screen shift chart. With this feature, the time required for creating the screen shift chart can largely be reduced.

A screen editor according to another aspect of the present invention comprises a communicating unit (which corresponds to a communicating section 36 in the embodiment described later) for transmitting the screen information to a display unit through a communication line.

The screen editor according to this invention prepares screen information such as the screen switching information, while the communicating unit transmits the prepared screen information through a communication line or the like. With this feature, the time required for setting the screen information for each screen therein can be reduced.

A screen editor according to another aspect of the present invention comprises a screen information managing unit (which corresponds to a data managing section 37 in the embodiment described later) for managing screen information.

The screen editor according to this invention stores and manages the screen information including the prepared screen switching information, the display information, and the component information or the like in the screen information managing unit. With this feature, the screen editor can easily respond to the processing required for retrieving the information, changing the displayed screen, and changing the target to be switched.

In a screen editor according to another aspect of the present invention, a screen editing unit has screen symbols with which conditions for switching the screens and component information can be expressed, and the screen editing unit creates the screen shift chart using these screen symbols.

In the screen editor according to this invention, when creating a screen shift chart the screen editing unit expresses a hierarchical structure by using the screen symbols as well as an interconnection chart between these symbols. With this feature, the conditions required for switching the screens and component information, and forms thereof are standardized and unified. This allows operability of creating the screen shift chart to be enhanced and realize an easier management of the hierarchical structure because the various conditions and information are more easily be understood.

In a screen editor according to another aspect of the present invention, a screen editing unit determines whether description in the created screen shift chart is generated according to the specification of a prespecified hierarchical structure or not, and issues a notice to that effect when it is determined that the description does not satisfy the specification.

The screen editor according to this invention automatically determines, when an unwanted screen is deleted or when the target screen is changed or the like, the mismatch in the screen shift chart, and issues a notice to that effect when a mismatch is detected. With this feature, the screen switching information corresponding to all the related screens can more easily be corrected, a chance of occurrence of an omission of correction or of an improper correction can be reduced, and further the time required for creation of a screen shift chart and correction thereof can be reduced.

In a screen editor according to another aspect of the present invention, the screen editing unit confirms, when a previously created screen is specified again as a target screen to be switched thereto at the time of creating a screen shift chart, that there is no violation of the rules in the prespecified hierarchical structure, and then automatically sets the screen switching information for the screen.

The screen editor according to this invention automatically sets, when a target screen to be switched thereto of a screen is identical to that previously created and if resetting of the information does not generate inconsistency in the screen shift chart, the screen switching information for the screen. With this feature, the time and efforts in preparing the same screen switching information again can be omitted. Further, the processing time can largely be reduced because the screen editing unit automatically sets the previously prepared screen switching information.

In a screen editor according to another aspect of the present invention, a screen editing unit automatically generates a screen shift chart by extracting screen switching information from previously prepared screen information and linking between screens according to the extracted information.

In the screen editor according to this invention, the screen shift chart is not created through an operation by a person who wants to create a screen but the screen editing unit automatically creates a screen shift chart by utilizing the previously prepared screen information. With this feature, the hierarchical structure of a displayed screen which does not have a screen shift chart can also be managed.

In a screen editor according to another aspect of the present invention, a screen editing unit automatically reflects, when the screen shift chart is changed, the changed section and sections related to the change to the screen information.

The screen editor according to this invention automatically corrects, when an unwanted screen is deleted or when the target screen is changed or the like, the screen information for all the related screens. With this feature, there is no need to correct the screen switching information set on all the related screens. Thus, a chance of occurrence of an omission of correction or of an improper correction can be eliminated, and further the time required for correction of the screen shift chart can be reduced.

BRIEF DESCRIPTION OF THE DRAWINGS

FIG. 5 is a view showing touch switch information.

BEST MODE FOR CARRYING OUT THE INVENTION

More detailed description is made for the present invention with reference to the attached drawings.

Figure 1:
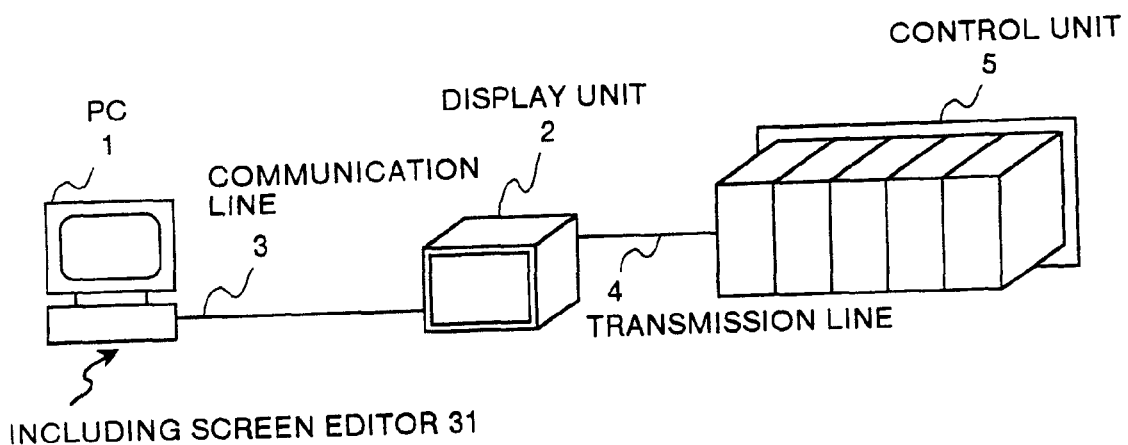
FIG. 1 is a system configuration which shows a positional relation of the screen editor according to the present invention.

FIG. 1 is a view of system configuration for showing a positional relation of the screen editor according to the present invention. This system comprises a personal computer (a PC) 1 for providing the display control and editing the screen(s). A display unit 2 displays the screen(s) thereon. A control unit 5 manages the information required for displaying of the screen(s). The PC 1 and the display unit 2 are connected to each other through a communication line 3 while the display unit 2 and the control unit 5 are connected to each other through a transmission line 4. The display unit 2 displays a target screen under controls by the PC 1 and by reading the information from the control unit 5. The screen editor (which corresponds to the screen editor 31 in the figure) according to the present invention is provided in the PC 1 in this system.

In FIG. 1, the screen editor 31 operating on the PC 1 transmits the data for screen information as the control data for displaying a screen to the display unit 2 through the communication line 3 such as RS232C. The display unit 2 executes operations according to the received data for screen information and displays all the information (called displayed screen information hereinafter) required for displaying a screen with data such as a numeral, a message, a graph, a switch, or a lamp or the like each set therein by the screen editor 15 by being read from the control unit 5. It should be noted that the system configuration shown in FIG. 1 is one of the specific examples, and the functions of the display unit 2 may be performed utilizing the PC 1, or an integrated configuration may be employed in which functions of the display unit 2 and control unit 5 are performed utilizing the PC 1.

The screen editor 31 operating on the PC 1 provides controls over editing of the screen and display control of the display unit 2 which can display the screens while switching them. Further, the screen editor 31 creates a screen shift chart having a hierarchical structure required for switching of the screens expressed in a form of a chart. Details of the screen editor according to the present invention are described later.

Figure 2:
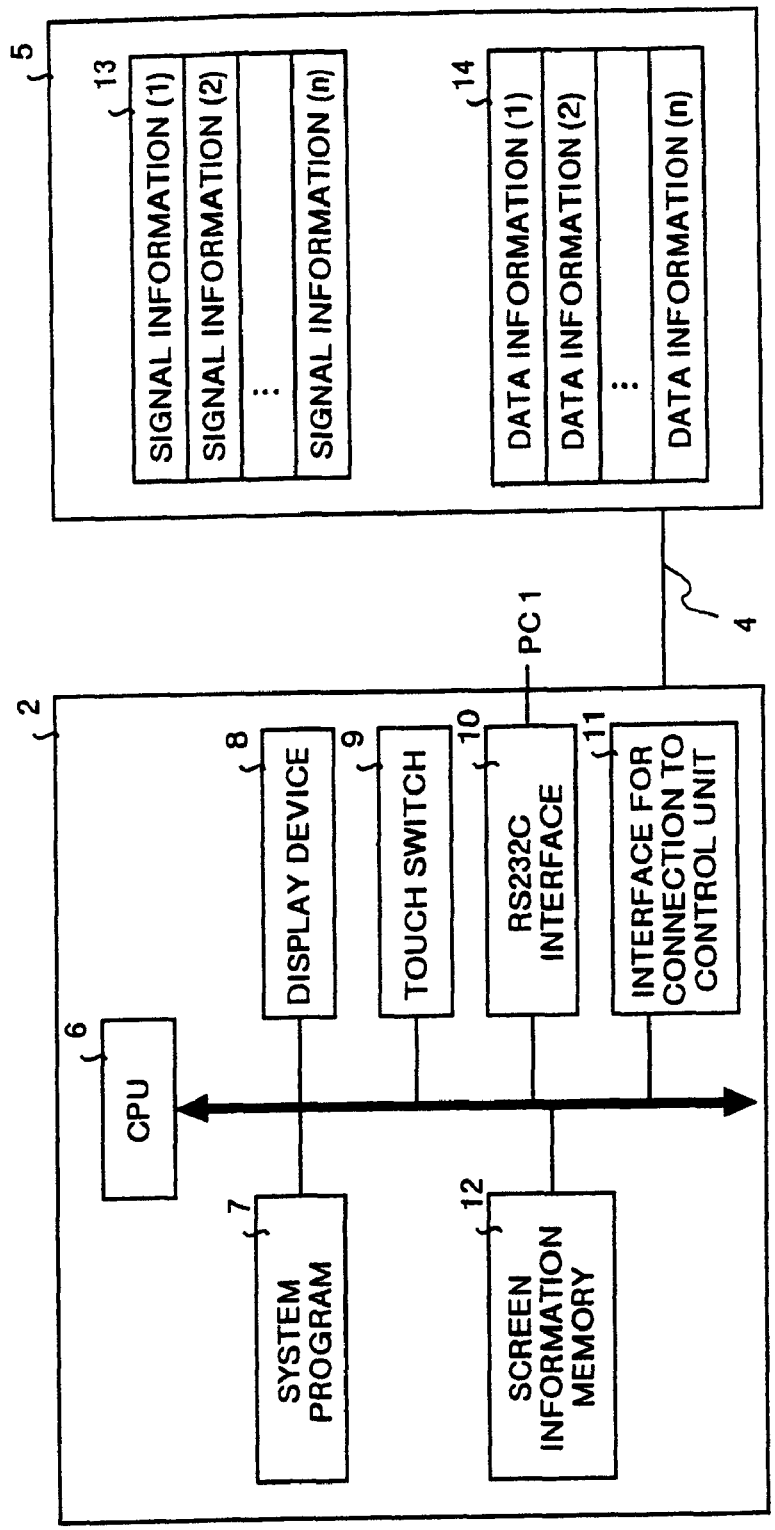
FIG. 2 shows a configuration of a display unit and a control unit.

As shown in FIG. 2, the display unit 2 has a CPU 6, a system program 7, a display device 8, a touch switch 9, an RS232C interface 10, an interface 11 for connection to a control unit, and a screen information memory 12. This display unit 2 displays a screen according to the data for screen information (including information for displayed screens and information for switching screens) prepared by the screen editor 31.

For instance, the screen information data transmitted from the PC 1 through the RS232C interface 10 is stored in the screen information memory 12. Herein, the CPU 6 reads the screen information data from the screen information memory 12 by executing the system program 7 and displays the screen by controlling the display device 8 according to this data. At that point, the CPU 6 reads the signal information 13 as bit information and the data information 14 as word information or the like as displayed screen information stored in the control unit 5 through the interface 11 for the control unit 5.

Figure 3:
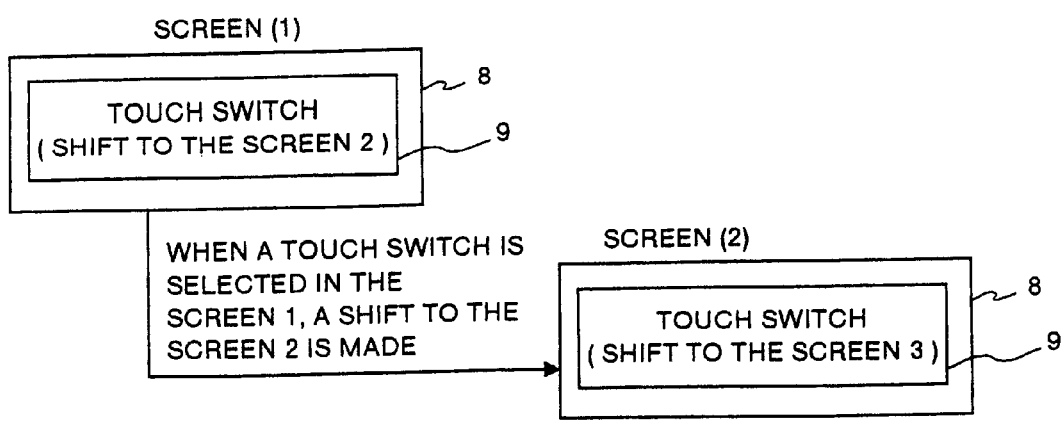
FIG. 3 shows one example of a screen displayed on the display unit.

As described above, the screen displayed on the display device 8 of the display unit 2 can be displayed as shown, for instance, in FIG. 3. As shown in FIG. 3, a screen (1) appears on the display device 8 with the touch switch 9 located within the screen, and the display on the display device 8 switches to a screen (2) as the next displayed screen when a user touches the touch switch 9. Herein, a processes performed by the system program 7 when the screen (1) shown in FIG. 3 is shifted to the screen (2) are explained with the help of the flowchart of screen switching process shown in FIG. 4.

Figure 4:
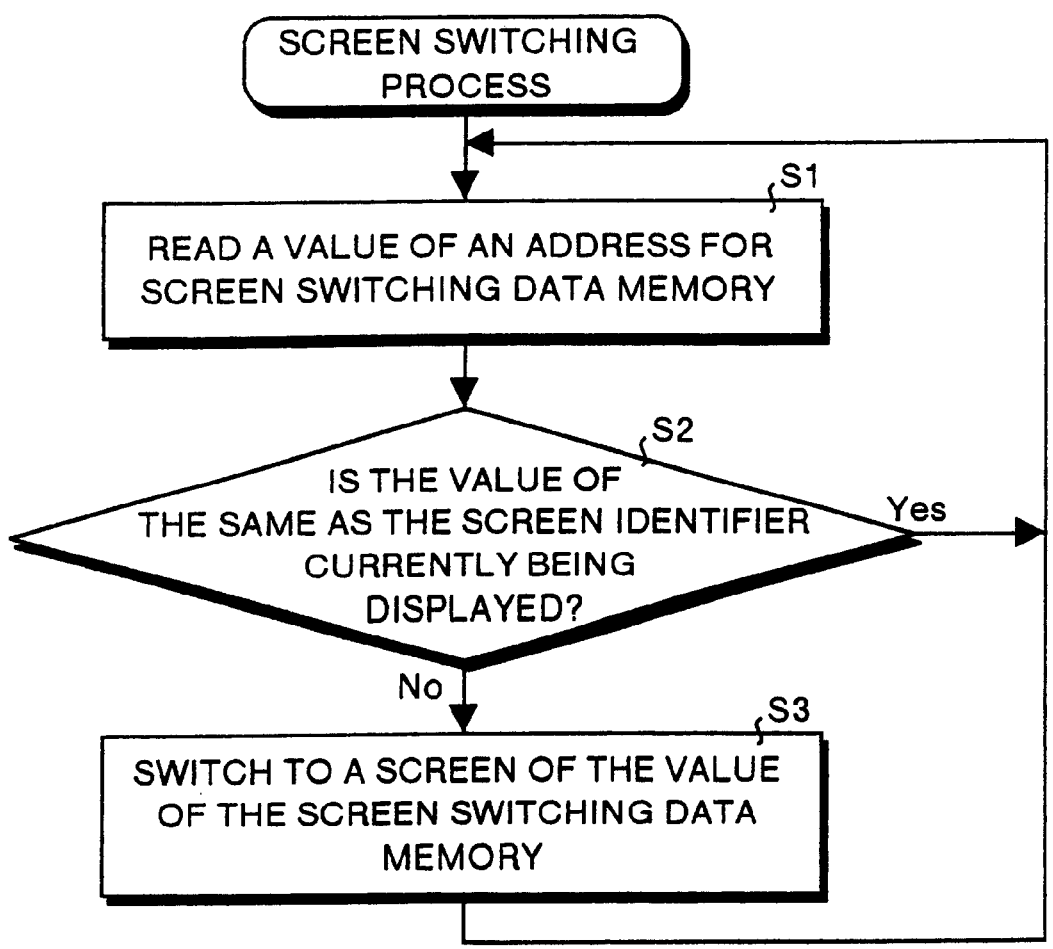
FIG. 4 is a flowchart of the screen switching process.

At first, the CPU 6 all the time monitors a touch made to the touch switch. This monitoring is performed by periodically reading a value of an address in a screen switching data memory for data 14 in the control unit 5 (FIG. 4, step S1). When the read-out value is identical to the value corresponding to the currently appearing screen (1) (Yes in step S2) the screen is not switched.

For instance, when the touch switch 9 is touched in this state, the CPU 6 writes a preset target screen identifier 24 for switching (Refer to FIG. 5), as touch switch information, namely a value corresponding to the screen (2) in the screen switching data memory address of the data 14. Immediately after the writing, the value of the data 14 read-out by the CPU 6 becomes the value corresponding to the screen (2) (No in step S2) which is detected in step S1. Therefore, the CPU 6 performs the processing of switching the appearing screen (1) to the screen (2) (step S3). Thereafter and on, monitoring in step S1 is performed again and the processing of screen switching is repeated each time the value of the address in the screen switching data memory for the data 14 is rewritten.

It should be noted that, as shown in FIG. 5, the touch switch information preset in the touch switch on the screen consists of data type 21 indicating touch switch information, ID 22 indicating a serial number of each component on the screen, physical key information 23 indicating coordinates of the displayed touch switch, the target screen identifier 24 for switching, a switching condition address 25 indicating addresses where a switching condition is stored, a switching condition 26 indicating a condition for switching screen, displayed graphics information 27 indicating displayed graphics of the touch switch, and other information 28, and some of them requiring description again will be explained hereinafter when it is necessary.

Detailed description is made hereinafter for creation of a screen shift chart and processing concerning editing of screens and display controls of the display unit by the screen editor according to the present invention with reference to the drawings.

Figure 6:
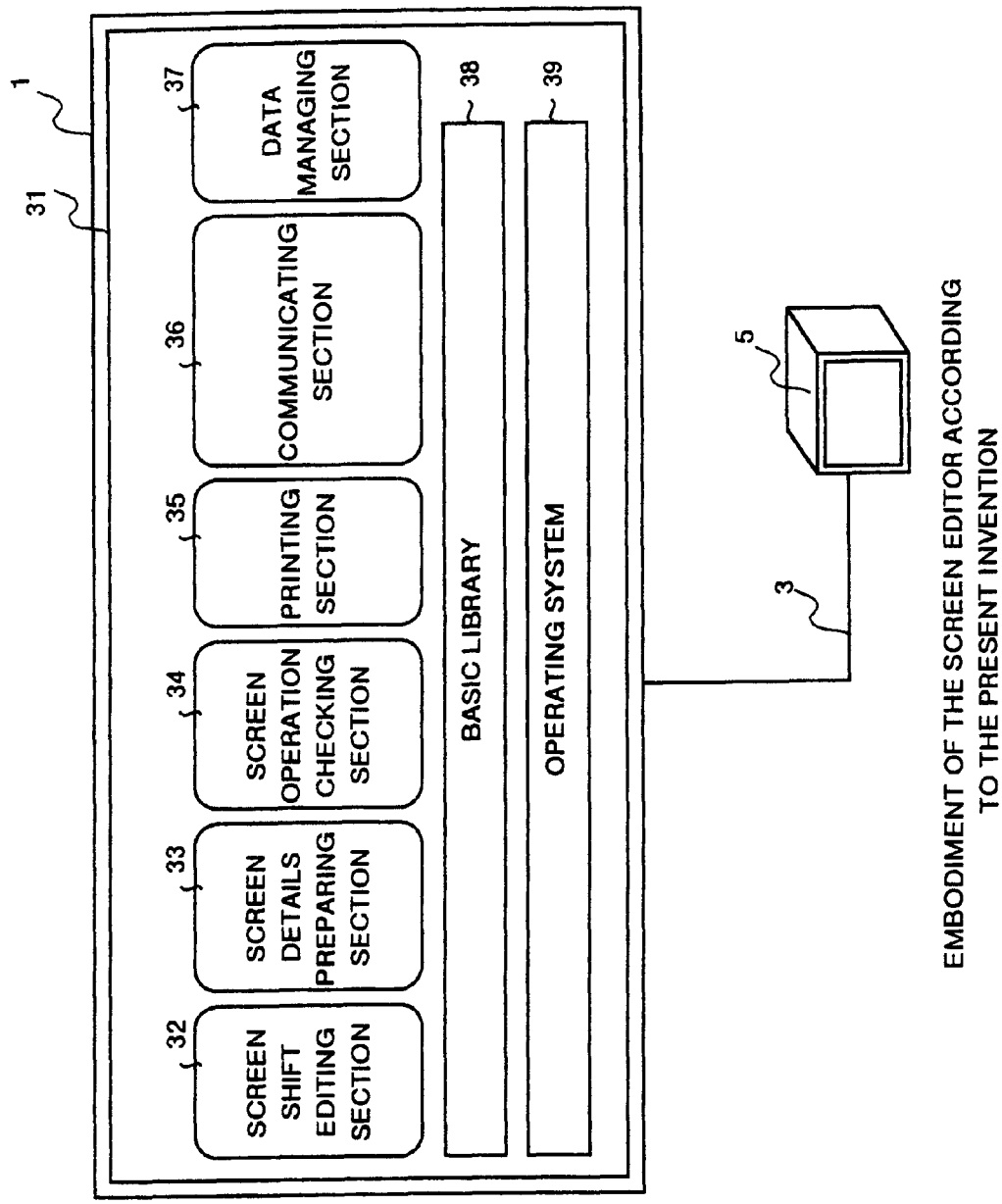
FIG. 6 shows an embodiment of the screen editor according to the present invention.

FIG. 6 is a view showing an embodiment of the screen editor according to the present invention.

The screen editor 31 according to the present invention operating on an operating system 39 of the PC 1 by using a basic library 38 comprises a screen shift editing section 32, a screen details preparing section 33, a screen operation checking section 34, a printing section 35, a communicating section 36, and a data managing section 37.

Herein, description is made for functions of the sections constituting the screen editor 31 according to the present invention. At first, the screen shift editing section 32 has functions such as creating a screen shift chart expressing a hierarchical structure in association with switching of screens in a chart form, preparing screen switching information for shifting the screen according to this screen shift chart, and automatically setting the screen switching information in the display unit 2. The screen details preparing section 33 has a function of preparing displayed screen information including detailed display information for each screen and component information concerning a touch switch in each screen. The screen operation checking section 34 has a function of checking an operation of the prepared data for screen information. The printing section 35 has a function of printing the created screen shift chart and other information. The communicating section 36 has a function of transmitting the prepared screen information data to the display unit 2. Finally, the data managing section 37 has a function of managing the prepared screen information data and screen shift charts.

Figure 7:
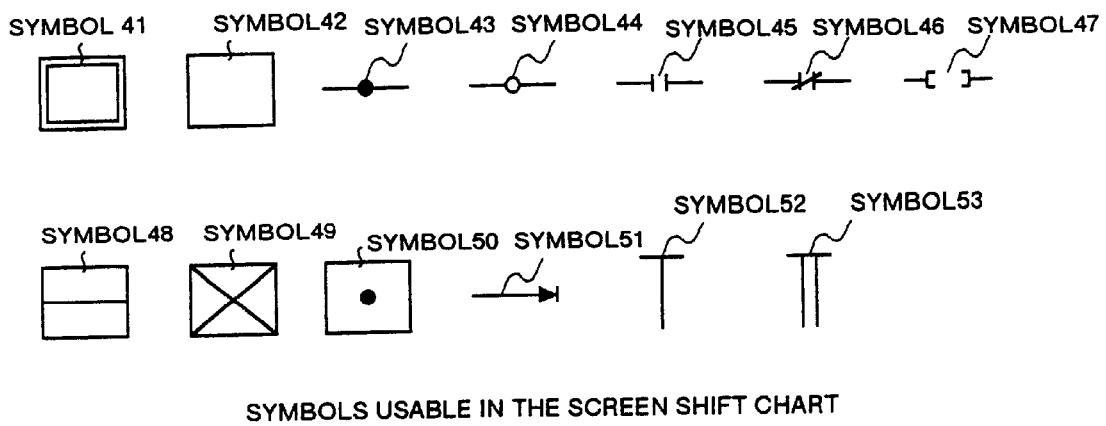
FIG. 7 shows the symbols usable in the screen shift chart.

FIG. 7 shows the symbols required for creating a screen shift chart. The symbols are screen symbols that express conditions for switching of the screens as well as component information. The screen shift editing section 32 creates a screen shift chart using these screen symbols. Namely, a screen shift chart having a hierarchical structure can be expressed by using these screen symbols. By creating the screen shift chart with the screen symbols, the conditions required for switching the screens and component information and forms thereof can be standardized and unified. This allows operability of creating the screen shift chart to be enhanced and further easier management of hierarchical structure to be achieved because the various conditions and information can more easily be understood.

For example, the symbol 41 represents an initial screen first appearing when the power of the display unit 2 is turned ON. The symbol 42 represents a target screen to be switched when the touch switch is touched. The symbol 43 represents a conditional switching symbol in which a condition is set for switching the screen. It should be noted that this condition is stored in the control unit 5 (signal information 13 or data information 14) specified by the switching condition address 25 in the touch switch information (Refer to FIG. 5) described above, and the condition read therefrom is set to a switching condition 26 as a condition for the symbol 43. The symbol 44 represents an unconditional switching symbol indicating that no condition is set for switching the screen. The symbol 45 represents a branching symbol (called a contact-a symbol hereinafter) when the switching condition 26 (condition read from the signal information 13) is set. The symbol 46 represents another branching symbol (called a contact-b symbol hereinafter) when the switching condition 26 (condition read from the signal information 13) is set. The symbol 47 also represents a branching symbol when the switching condition 26 (condition read from the data information 14) is set. It should be noted that the condition is described within the brackets of the symbol. The symbol 48 represents an indirect screen symbol for shifting a screen, when the switching condition 26 (condition read from the data information 14) has a range, to one with a screen identifier corresponding to the data value. The symbol 49 represents a hold screen symbol indicating that a screen is not switched when a condition for a range of a specified value or data value is satisfied. The symbol 50 represents a repeat screen symbol indicating that the identical screen is used more than twice in the shift chart. The symbol 51 represents a jump-to-highest-level symbol indicating an operation of returning to the initial screen which is the highest level screen. The symbol 52 represents an identical level linking symbol for linking the screens in the identical level to each other and indicates that the screens can not be switched in the same level. The symbol 53 also represents an identical level linking symbol for linking the screens in the identical level to each other and indicates that the screens can be switched in the same level.

Figure 8:
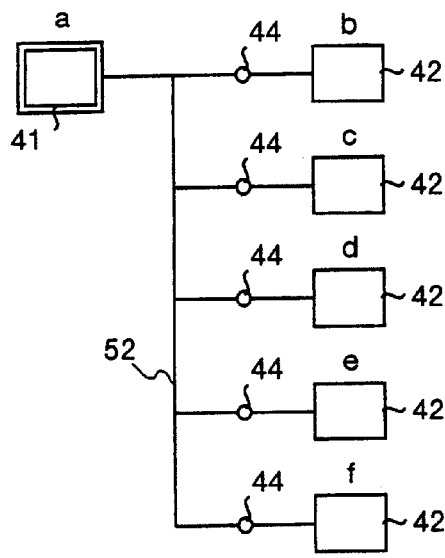
FIG. 8 is a view showing a first example of the screen shift chart.

FIG. 8 is a first screen shift chart created in the screen shift editing section 32 using the above symbols. This screen shift chart is an example when the initial screen 'a' is switched to five screens (which correspond to the screen 'b', screen 'c', screen 'd', screen 'e', and screen 'f'). This screen shift chart indicates that the screens can unconditionally be switched to any of them by touching the touch switch. More specifically, to start with, the identical level linking symbol 52 is connected to the symbol 41 as the initial screen, then five unconditional switching symbols 44 are connected to the identical level linking symbol 52, and finally, the symbols 42 each as a switched screen are connected to the symbols 44. Screen identifiers ('a', 'b', 'c', 'd', 'e', and 'f' in the figure) are specified for the symbol 41 as an initial screen and the symbols 42 as switched target screens respectively. The screen identifiers may be different from each other or they may be the same for all the screens. Also the screen numbers are not limited to the number described above. For instance, any other expression such as a title of a screen may be used on condition that it can identify a screen.

Then, the screen shift editing section 32 of the screen editor according to the present invention generates screen switching information based on this screen shift chart (FIG. 8), and controls to set the screen switching information for each screen ('a', 'b', 'c', 'd', 'e', and 'f' in FIG. 8).

Figure 9:
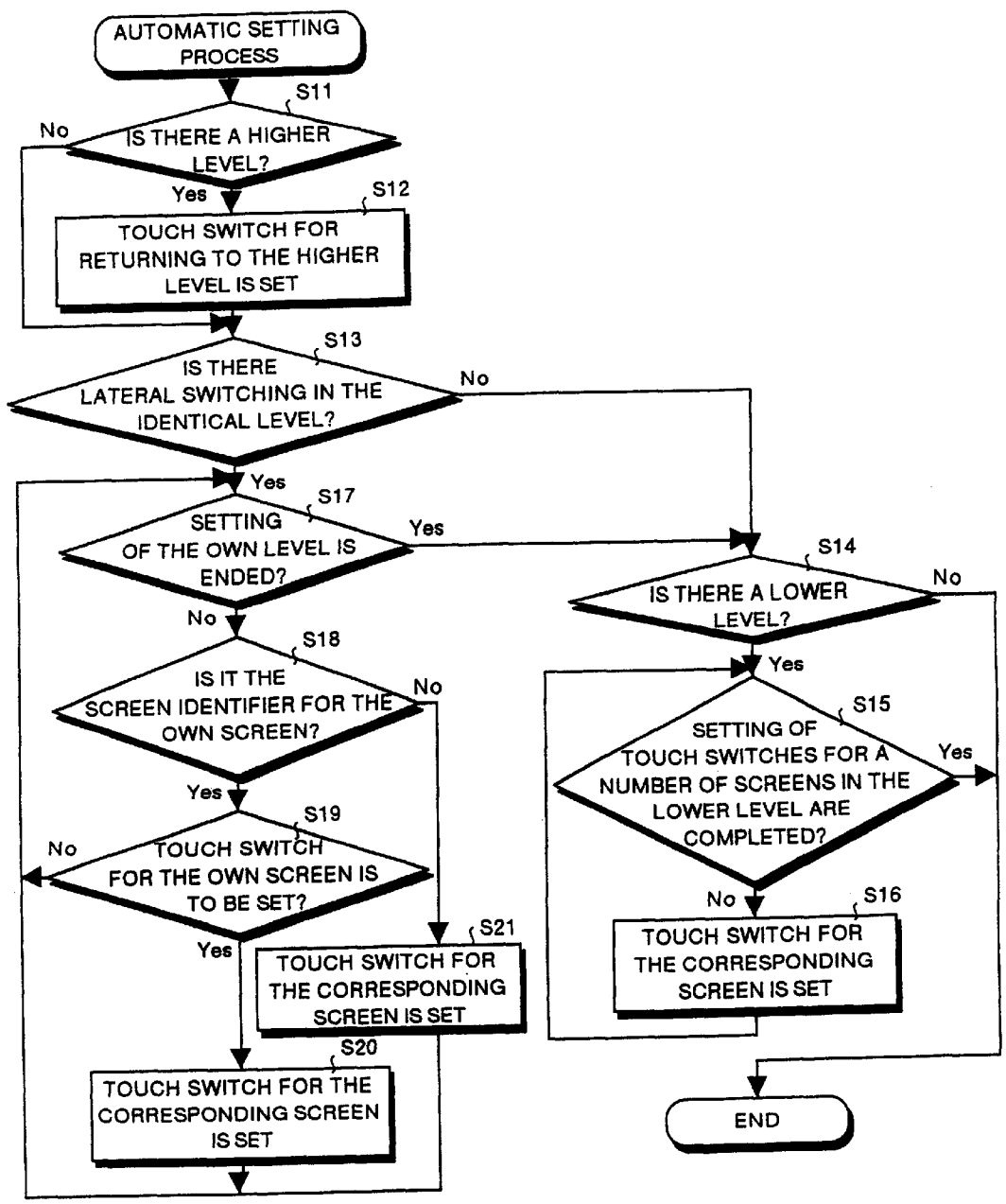
FIG. 9 is a flowchart of a process for automatically setting the screen switching information, FIG. 10 shown outlines of the screens edited and displayed according to FIG. 8.

FIG. 9 shows a flowchart of a process for automatically setting the screen switching information. At first, the screen shift editing section 32 checks whether a higher level screen is present to the screen 'a' shown in FIG. 8 or not (FIG. 9, step S11). Herein, the screen shift editing section 32 does not perform any setting because the screen 'a' is at the highest level (No in step S11), and checks whether there is lateral switching in the identical level or not (S13). Herein, the screen shift editing section 32 does not also perform any setting because the screen 'a' has no screen in the lateral level thereto (No in step S13), and checks whether the screen 'a' has any screen at a lower level or not (step S14).

Because the screen 'a' has lower level screens (Yes in step S14), the screen shift editing section 32 prepares screen switching information for setting a touch switch for the screen 'b' in the screen 'a', and sets a touch switch corresponding to the screen 'b' (No in step S15) (step S16). Thereafter, the screen shift editing section 32 repeats this processing until the setting of touch switches corresponding to all the screens in the lower level ('c', 'd', 'e', and 'f') is complete, and ends the setting of the screen switching information for the screen 'a' when the setting of the touch switch corresponding to the screen 'f' is complete.

Then, the screen shift editing section 32 checks whether a higher level screen is present to the screen 'b' in FIG. 8 or not (step S11). Herein, because the screen 'b' has the screen 'a' at its higher level (Yes in step S11), the screen shift editing section 32 prepares screen switching information for setting a touch switch corresponding to the screen 'a' in the screen 'b', and sets the touch switch corresponding to the screen 'a' (step S12).

Thereafter, the screen shift editing section 32 checks whether there is lateral switching in the identical level or not (step S13), also checks whether there is a lower level screen or not (step S14). The screen shift editing section 32 ends the setting of the screen switching information for the screen 'b' because, although the screen 'b' has a lateral level thereto, the lateral switching is prohibited by the symbol 52 (No in step S13), and further there is no lower level screen to the screen 'b' (No in step S14). The screen shift editing section 32 repeats the same processing as that for the screen 'b' thereafter for each of the screen 'c', 'd', 'e', and 'f', and ends the setting of the screen switching information to all the screens.

Figure 10:
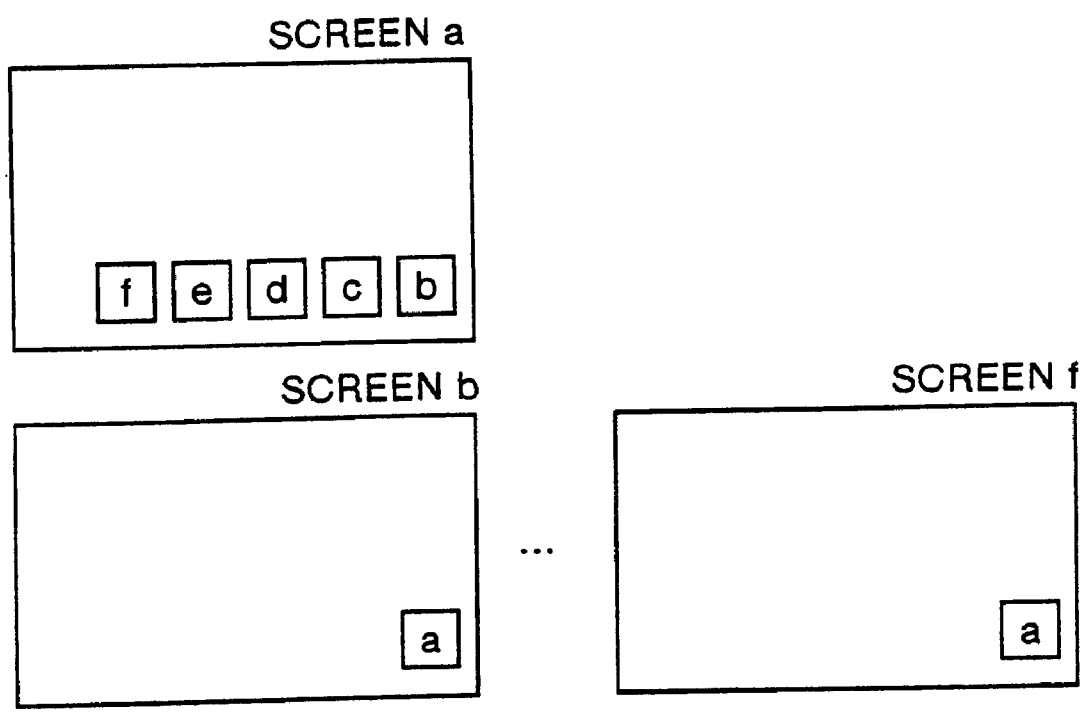

FIG. 10 is a view showing outlines of each of the screens edited and displayed by setting the screen switching information determined based on the screen shift chart in FIG. 8. These screens can be shifted, by touching a touch switch created inside each screen, to the corresponding screen. It should be noted that information such as a location of the touch panel on each screen and the size of the touch switch can previously be set. The setting of screen switching information is basically performed successively from the higher level screens in the descending order, and is performed in an arbitrary order for the lateral level screens.

Figure 11:
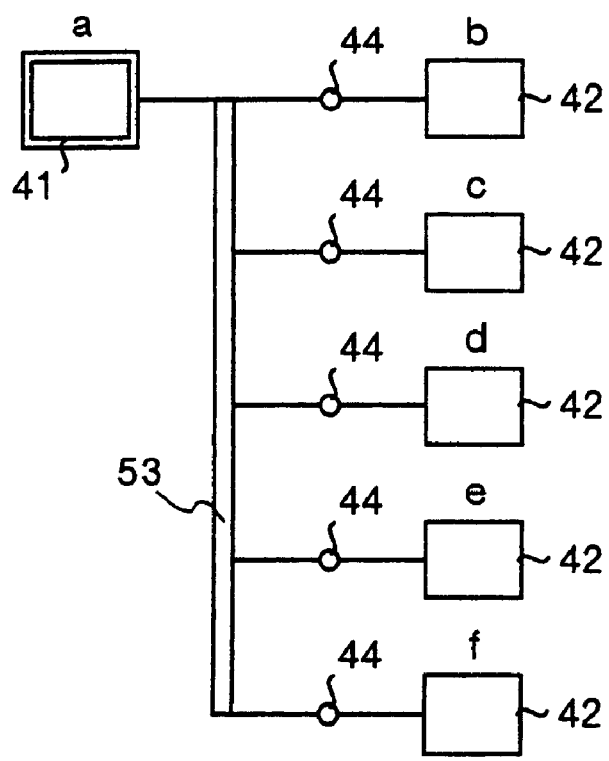
FIG. 11 is a view showing a second example of the screen shift chart.

FIG. 11 is a second screen shift chart created by using the above symbols. This screen shift chart is an example, similarly to FIG. 8, when the initial screen 'a' is switched to five screens (which correspond to the screen 'b', screen 'c', screen 'd', screen 'e', and screen 'f'), and shows that the screen can unconditionally be switched to any of them when the touch switch is touched. The difference with respect to the FIG. 8 is that lateral switching of screens is realized by using the symbol 53 in place of the symbol 52. More specifically, in the beginning, the identical level linking symbol 53 is connected to the symbol 41 as the initial screen 'a', then five unconditional switching symbols 44 are connected to the identical level linking symbol 53, and finally, the symbols 42 each indicating a switched target screen are connected to the symbols 44.

Herein, the screen shift editing section 32 of the screen editor according to the present invention generates screen switching information based on this second screen shift chart (FIG. 11), and controls to set the screen switching information for each screen ('a', 'b', 'c', 'd', 'e', and 'f' in FIG. 11). It should be noted that the setting of the screen 'a' is the same as that in FIG. 8 described above, and description thereof is omitted herein.

At first, the screen shift editing section 32 checks whether the screen 'b' in FIG. 11 has a higher level screen or not (step S11). Herein, as the screen 'b' has screen 'a' at its higher level (Yes in step S11), then the screen shift editing section 32 prepares the screen switching information for setting a touch switch corresponding to the screen 'a' in the screen 'b', and creates and sets the touch switch corresponding to the screen 'a' (step S12).

Thereafter, the screen shift editing section 32 checks whether there is lateral switching in the identical level or not (step S13). The screen 'b' has a screen at a lateral level thereto because lateral switching is permitted by the symbol 53 (Yes in step S13) . Therefore, the processing shifts to the setting of a touch switch corresponding to each screen (No in step S13). It should be noted that the processing is successively carried out to the screens in the order of 'b', 'c', 'd', 'e', and 'f'. At first, as the screen 'b' is the own screen identifier (Yes in step S18), the screen shift editing section 32 confirms whether a touch switch corresponding to the own screen is set or not (step S19). When it is determined that the switch is to be set (Yes in step S19), the screen shift editing section 32 prepares the screen switching information for setting a touch switch for the screen 'b' in the screen 'b' and creates and sets the touch switch corresponding to the screen 'b' (step S20). Then the processing is advanced. On the other hand, when it is determined that the switch is not to be set (No in step S19), the screen shift editing section 32 does not create or set a touch switch. Then the processing is advanced.

Next, the screen shift editing section 32 prepares screen switching information for setting a touch switch corresponding to screen 'c' in the screen 'b' because the screen c is not the own screen identifier (No in step S18), and creates and sets the touch switch corresponding to the screen 'c' (step S21). Hereafter, touch switches corresponding to the screens 'd', 'e', and 'f' are created and set in the same manner as the touch switch corresponding to the screen is created and set.

After the setting for lateral switching for the screen b is ended (Yes in step S17), the screen shift editing section 32 checks whether the screen 'b' has a lower level screen or not (step S14). Since the screen 'b' does not have a lower level screen (No in step S14), the screen shift editing section 32 ends the process of setting of the screen switching information for the screen 'b'. After the step, the screen shift editing section 32 repeats the same processing as that for the screen 'b' to the screens 'c', 'd', 'e', and 'f', and ends the setting of the screen switching information to all the screens.

Figure 12:
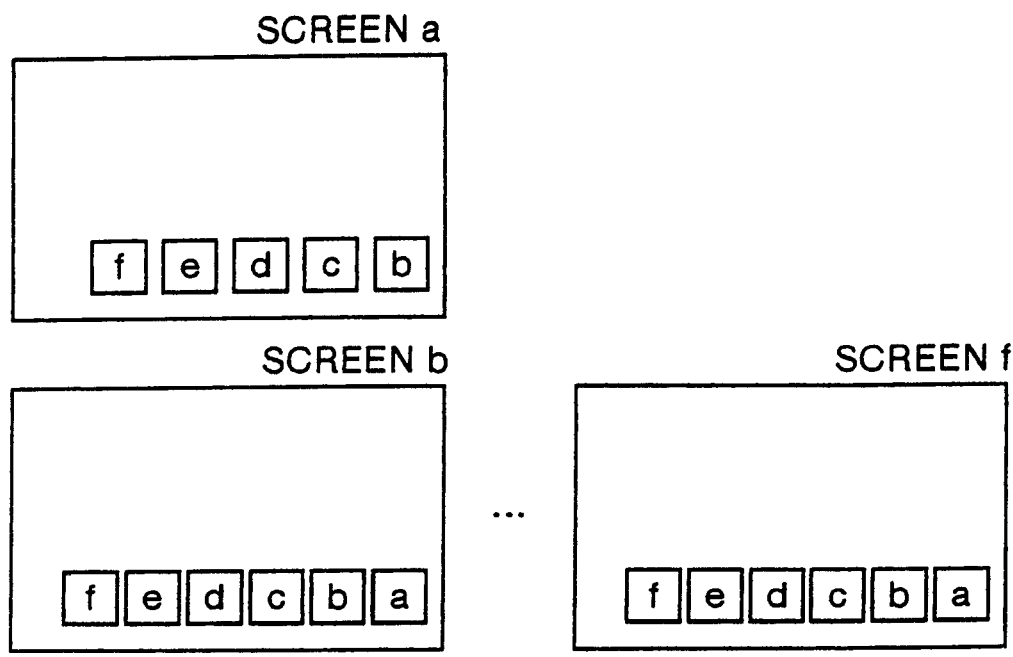
FIG. 12 is a view showing outlines of the screens edited and displayed according to FIG. 11.
Figure 13:
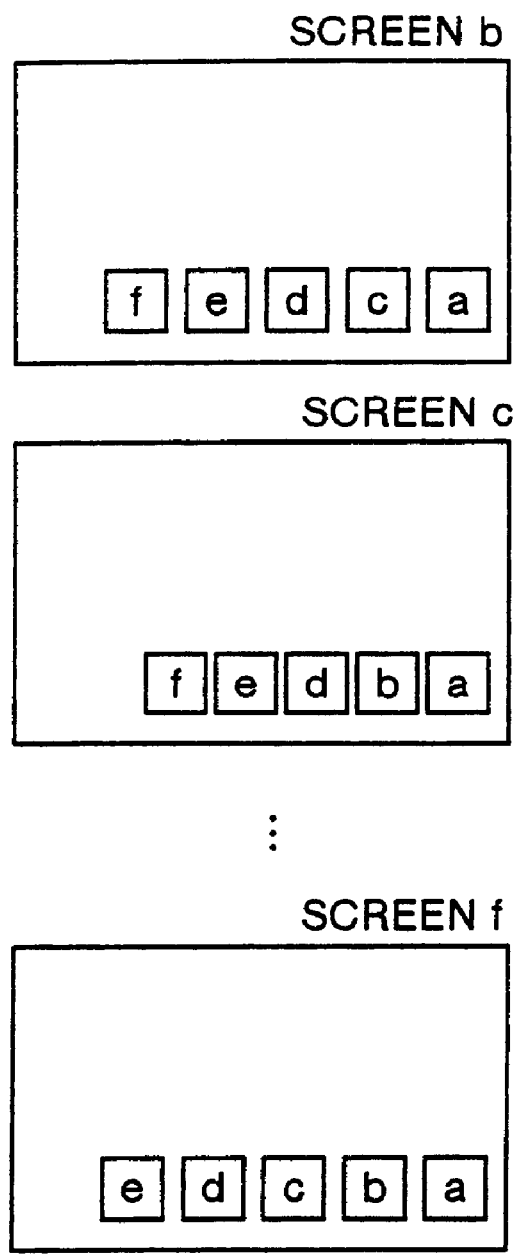
FIG. 13 is a view showing outlines of the screens edited and displayed according to FIG. 11.

FIG. 12 and FIG. 13 each show outlines of edited and displayed screens by setting screen switching information performed based on the screen shift chart in FIG. 11. It should be noted that FIG. 12 shows a case where a touch switch for own screen is set therein in the step S19 of FIG. 9. On the other hand, FIG. 13 shows a case where a touch switch for own screen is not set therein. Description of the same sections as those in FIG. 10 is omitted herein.

Figure 14:
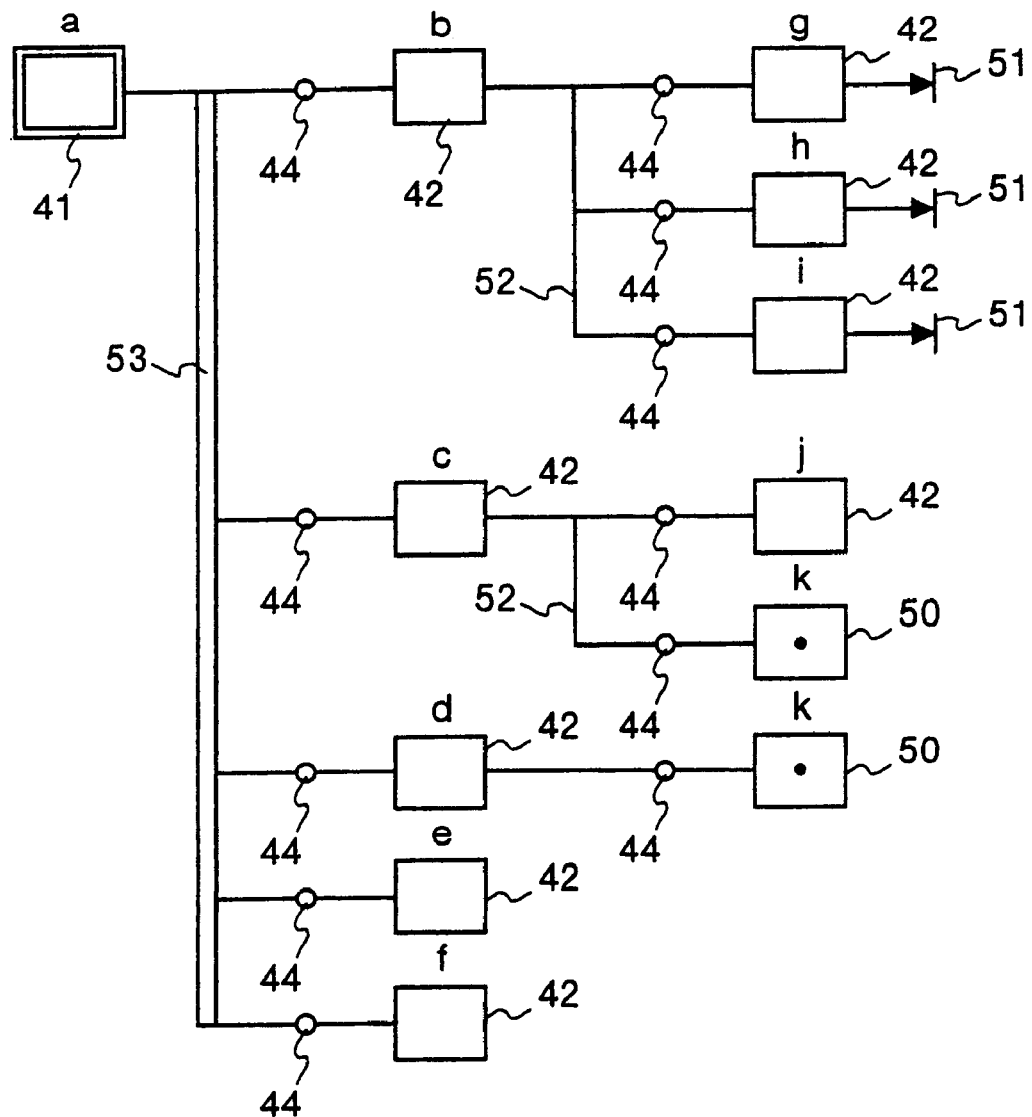
FIG. 14 is a view showing a third example of the screen shift chart.

FIG. 14 is a third screen shift chart created by using the above symbols. This screen shift chart is an example of three-level structure in which the initial screen 'a' is switched to five lower-level screens (which correspond to the screen 'b', screen 'c', screen 'd', screen 'e', and screen 'f') and these lower-level screens can be switched further to still lower-level screens (which correspond to the screen 'g', screen 'h', screen 'i', screen 'j', and screen 'k') . This screen shift chart indicates that the screens can unconditionally be switched to any of them by touching the touch switch.

More specifically, to start with, the identical level linking symbol 53 is connected to the symbol 41 as an initial screen 'a', then five unconditional switching symbols 44 are connected to the identical level linking symbol 53. Further, the symbols 42 indicating the screens 'b', 'c', 'd', 'e', and 'f' as targets for switching are connected to each of the symbols 44. Further, the identical level linking symbol 52 is connected to the symbol 42 indicating the screen 'b' as a target for switching, then three unconditional switching symbols 44 are connected to the symbol 52. Next, the symbols 42 indicating the screens 'g', 'h', and 'i' as targets for switching are connected to each of the symbol 44. Finally, a jump-to-highest-level symbol 51 is connected to each of the symbol 42. An identical level linking symbol 52 is also connected to the symbol 42 indicating the screen 'c' as a target for switching. Further, two unconditional switching symbols 44 are connected to the symbol 42. Finally, the symbols 42 and 50 indicating the screens 'j' and 'k' respectively as targets for switching are connected to the symbols 44 respectively. An unconditional switching symbol 44 is connected to the symbol 42 indicating the screen 'd' as a target for switching, and a symbol 50 indicating the screen 'k' as a target for switching is connected to this symbol 44. It should be noted that both the screens 'c' and 'd' are switched to the same screen 'k', therefore the screen 'k' as a target for switching is indicated by the symbol 50.

This screen shift chart (FIG. 14) is a chart with a function added thereto so that the screens 'b', 'c', and 'd' in FIG. 11 are each capable of switching to the higher level screen as well as to screen in the identical level can further be switched to screens in the lower level.

Figure 15:
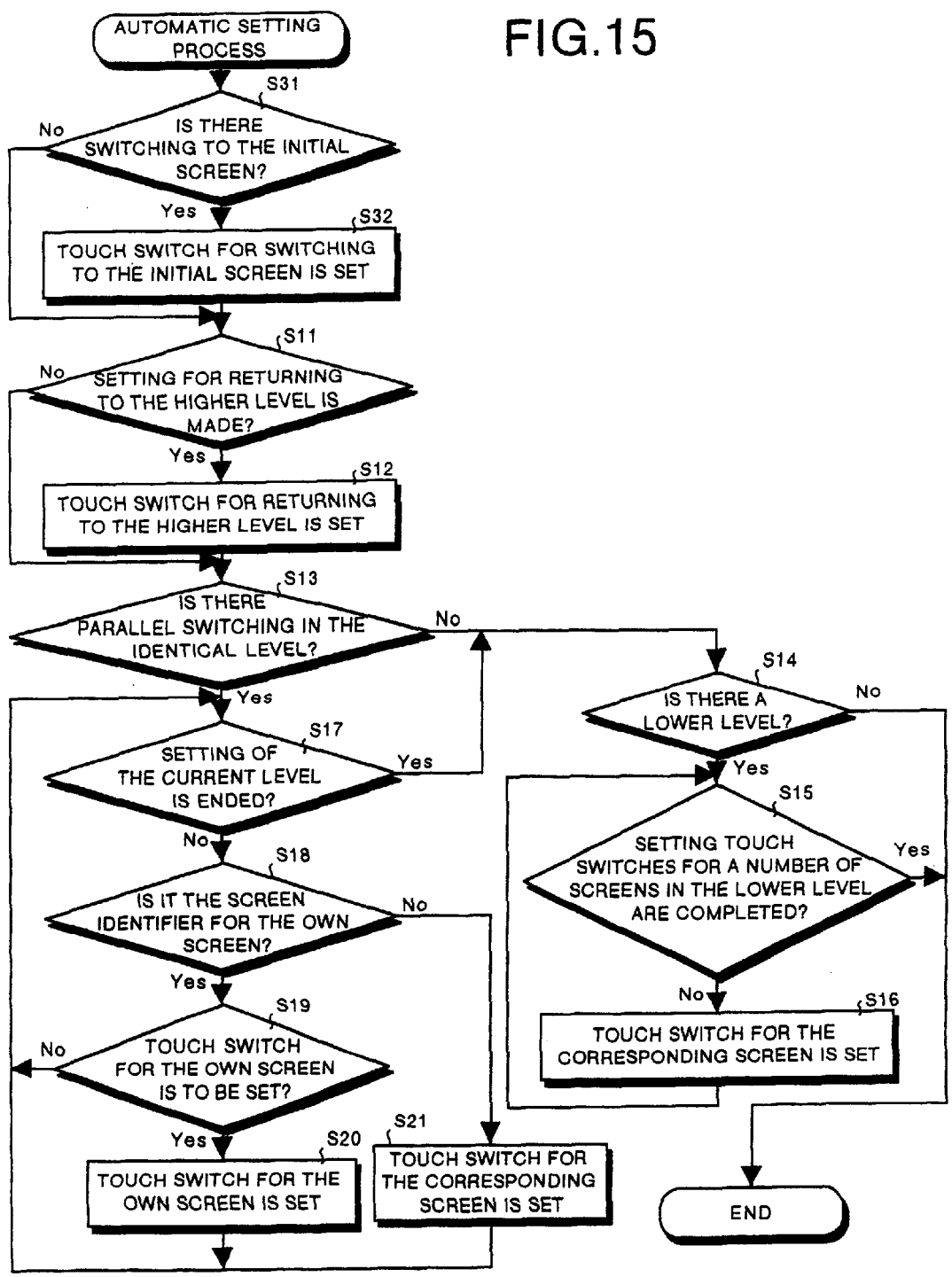
FIG. 15 is a flowchart of a process for automatically setting the screen switching information.

Herein, the screen shift editing section 32 of the screen editor according to the present invention generates screen switching information based on the third screen shift chart (FIG. 14), and controls to set the screen switching information for each screen ('a', 'b', 'c', 'd', 'e', 'f', 'g', 'h', 'i', 'j', and 'k' in FIG. 14). FIG. 15 is a flowchart showing a process for automatically setting the screen switching information according to FIG. 14. In this case, the screen switching information is created and set in the order of the screen 'a' in the highest level first, then the screens 'b' to 'f' in the second level, and finally the screens 'g' to 'k' in the lowest level. As the setting of the screen 'a' is the same as that of the screen 'a' in FIG. 8 described above, and setting of the screen 'e' and 'f' are the same as that of the screens 'e' and 'f' in FIG. 11 described above, description thereof is omitted herein. As for the setting of the screens 'b', 'c', and 'f', setting of a touch switch for switching a screen to the higher level and setting of a touch switch for switching a screen to any in the lateral level are the same as those for the screens 'b', 'c', and 'f' in FIG. 11 described above, so that description thereof is omitted herein. All the results of confirmation for setting the screens 'a' to 'f' in step S31 are NO.

Description thereafter will be made only for sections that have not been described yet.

In the screen 'b', after the setting of a touch switch for switching the screen to the screen 'a' which is at a higher level and setting of touch switches for switching the screen to the screens 'b' to 'f' each of which are at lateral level is ended (No in step S13), the screen shift editing section 32 checks whether the screen 'b' has a lower level screen or not (step S14).

As the screen 'b' has lower level screens (Yes in step S14), the screen shift editing section 32 prepares screen switching information for setting a touch switch corresponding to the screen 'g' in the screen 'b', and creates and sets a touch switch corresponding to the screen 'g' (No in step S15) in the screen 'b' (step S16). Then, the screen shift editing section 32 repeats this process until creation and setting of the touch switches corresponding to all the lower-level screens ('h' and 'i') is completed. The screen shift editing section 32 ends creation and setting of the screen switching information for the screen 'b' when the setting of the touch switch corresponding to the screen 'i' is completed (Yes in step S15).

In the screen 'c', after the setting of a touch switch for switching the screen to the screen 'a' which is at a higher level and setting of touch switches for switching the screen to the screens 'b' to 'f' each of which are at lateral level is ended (No in step S13), the screen shift editing section 32 checks whether the screen 'b' has a lower level screen or not (step S14).

As the screen 'c' has lower level screens (Yes in step S14), the screen shift editing section 32 prepares screen switching information for setting a touch switch corresponding to the screen 'j' in the screen 'c', and creates and sets a touch switch corresponding to the screen 'j' (No in step S15) in the screen 'c' (step S16). Then, the screen shift editing section 32 repeats this process until the setting of a touch switch corresponding to the lower-level screen 'k' is completed. The screen shift editing section 32 ends creation and setting of the screen switching information for the screen 'c' when the setting of the touch switch corresponding to the screen 'k' is completed (Yes in step S15).

In the screen 'd', after the setting of a touch switch for switching the screen to the screen 'a' which is at a higher level and setting of touch switches for switching the screen to the screens 'b' to 'f' each of which are at lateral level is ended (No in step S13), the screen shift editing section 32 checks whether the screen 'b' has a lower level screen or not (step S14).

As the screen 'd' has a lower level screen (Yes in step S14), the screen shift editing section 32 checks the screen switching information for setting the touch switch for the screen 'k' created in the screen 'c' to determine whether the information matches information for the screen 'd' or not. When it is determined that the setting of the information does not have any mismatch therebetween, the screen shift editing section 32 creates and sets a touch switch corresponding to the screen 'k' (No in step S15) in the screen 'd' (step S16). The screen shift editing section 32 ends creation and setting of the screen switching information for the screen 'd' when the setting of the touch switch corresponding to the screen 'k' is completed (Yes in step S15).

Then, the screen shift editing section 32 checks whether the screen 'g' has a jump-to-highest-level symbol 51 or not (step S31). Herein, as a jump-to-highest-level symbol 51 is connected to the screen 'g' (Yes in step S31), the screen shift editing section 32 prepares screen switching information for setting a touch switch corresponding to the screen 'a', and creates and sets a touch switch corresponding to the screen 'a' in the screen 'g' (step S32).

Then, the screen shift editing section 32 checks whether the screen 'g' in FIG. 14 has a higher level or not (step S11). Herein, as the screen 'g' has screen 'b' as a higher level screen (Yes in step S11), the screen shift editing section 32 prepares screen switching information for setting a touch switch corresponding to the screen 'b' in the screen 'g', and creates and sets a touch switch corresponding to the screen 'b' in screen 'g' (step S12).

Next, the screen shift editing section 32 checks whether a lateral switching is allowed in the identical level or not (step S13) and whether the screen 'g' has a lower level screen or not (step S14). Since lateral switching is prohibited in the screen 'g' because of the symbol 52 although a lateral level screen exist therewith (No in step S13), and because there is no lower level screen to the screen 'g' (No in step S14) the screen shift editing section 32 ends the setting of the screen switching information corresponding to the screen 'g'. Thereafter and on, the same processing as that for the screen 'g' is carried out for the screens 'h' and 'j'.

Then, the screen shift editing section 32 checks whether the screen 'j' has a jump-to-highest-level symbol 51 or not (step S31). Herein, as a jump-to-highest-level symbol 51 is not connected to the screen 'j' (No in step S31), the screen shift editing section 32 checks whether the screen 'j' has a higher level screen or not (step S11). Herein, as the screen 'j' has the screen 'c' as a higher level screen (Yes in step S11), the screen shift editing section 32 prepares screen switching information for setting a touch switch corresponding to the screen 'c' in the screen 'j', and creates and sets a touch switch corresponding to the screen 'c' in the screen 'j' (step S12).

Next, the screen shift editing section 32 checks whether a lateral switching is allowed in the identical level or not (step S13) and whether the screen 'j' has a lower level screen or not (step S14). Since lateral switching is prohibited in the screen 'j' because of the symbol 52 although a lateral level screen exist therewith (No in step S13), and because there is no lower level screen to the screen 'j' (No in step S14) the screen shift editing section 32 ends the setting of the screen switching information corresponding to the screen 'j'. Thereafter and on, the same processing as that for the screen 'j' is carried out for the screens 'k'.

Figure 16:
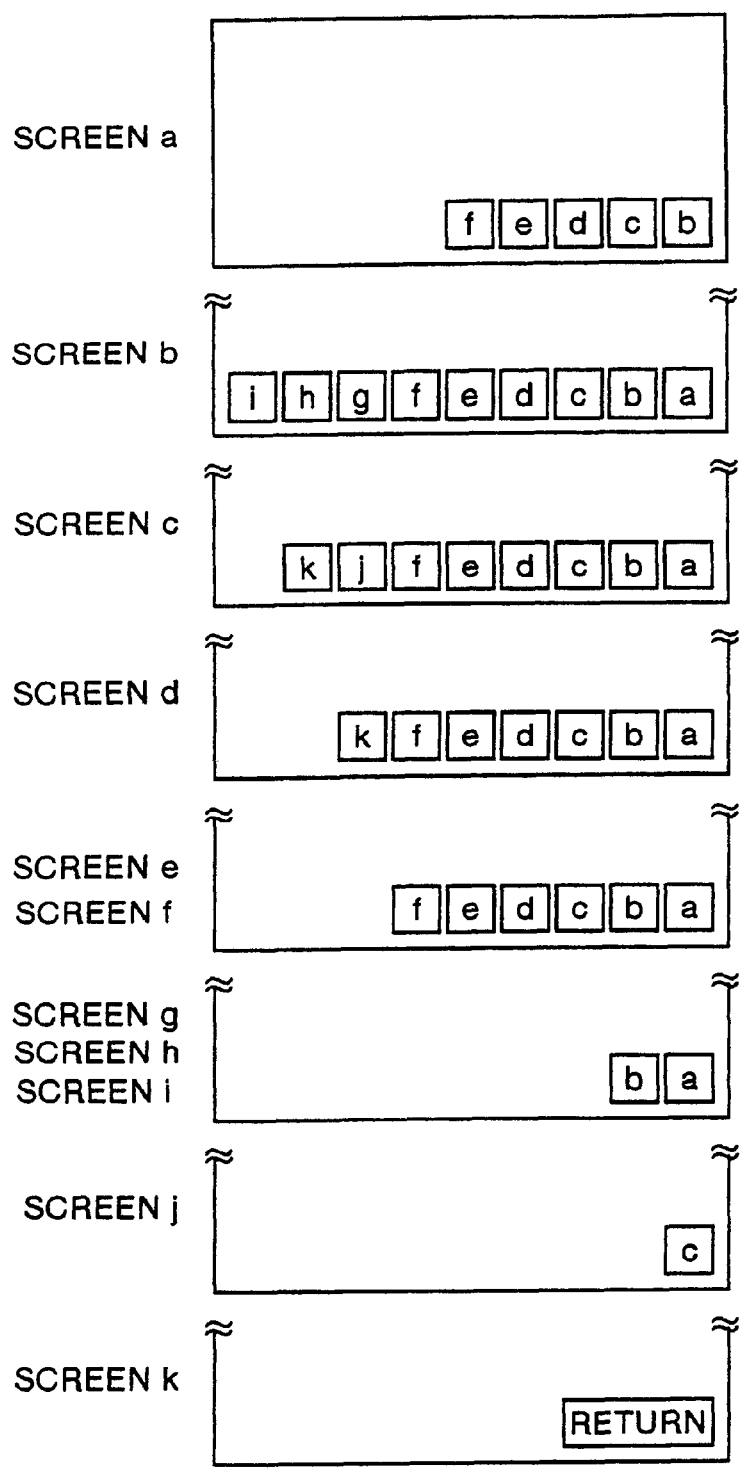
FIG. 16 is a view showing outlines of the screens edited and displayed according to FIG. 14.

FIG. 16 shows outlines of each of the screens edited and displayed performed based on the screen shift chart in FIG. 14.

As shown in FIG. 16, in the screen 'b', the touch switch corresponding to the screen 'a' as a target for switching to the higher level screen, touch switches corresponding to the screens 'b' to 'f' as targets for switching to the lateral level screens, and touch switches corresponding to the screens 'g', 'h', and 'i' as targets for switching to lower level screens are set. In the screen 'c', the touch switch corresponding to the screen 'a' as a target for switching to the higher level screen, touch switches corresponding to the screens 'b' to 'f' as targets for switching to the lateral level screens, and touch switches corresponding to the screens 'j' and 'k' as targets for switching to the lower level screens are set. In the screen 'e', the touch switch corresponding to the screen 'a' as a target for switching to the higher level screen, touch switches corresponding to the screens 'b' to 'f' as targets for switching to the lateral level screens, and touch switch corresponding to the screen 'k' as a target for switching to the lower level screen are set.

Further, as shown in FIG. 16, the screen 'k' can be selected by touching the corresponding touch switches in the screen 'c' and screen 'd'. Accordingly, two screens 'c' and 'd' are required to be switched to when the touch switch on the screen 'k' is operated. Thus, a touch switch called "Return" or the like which means that returning to the higher level is effected therethrough is set in the screen 'k'. The touch switch corresponding to the screen 'b' as a target for switching to the higher level screen and the touch switch corresponding to the initial screen 'a' are set in each of the screens 'g', 'h', and 'i'. The touch switch corresponding to the screen 'c' as a target for switching to the higher level screen is set in the screen 'j'. It should be noted that description of the same sections as those in FIG. 10, FIG. 12 and FIG. 13 is omitted herein.

Following rules are applied when setting the screen switching information as described above based on the screen shift chart in FIG. 14. For example, a check is made based on a rule that screen switching that crosses the levels is not allowed except when the symbol 53 is used. Accordingly, when any screen switching information against this rule is set, a message to the effect that the setting is not appropriate is displayed on the screen. With this feature, switching to a screen in the lateral level is not allowed in the level in which the symbol 52 is used.

Figure 17:
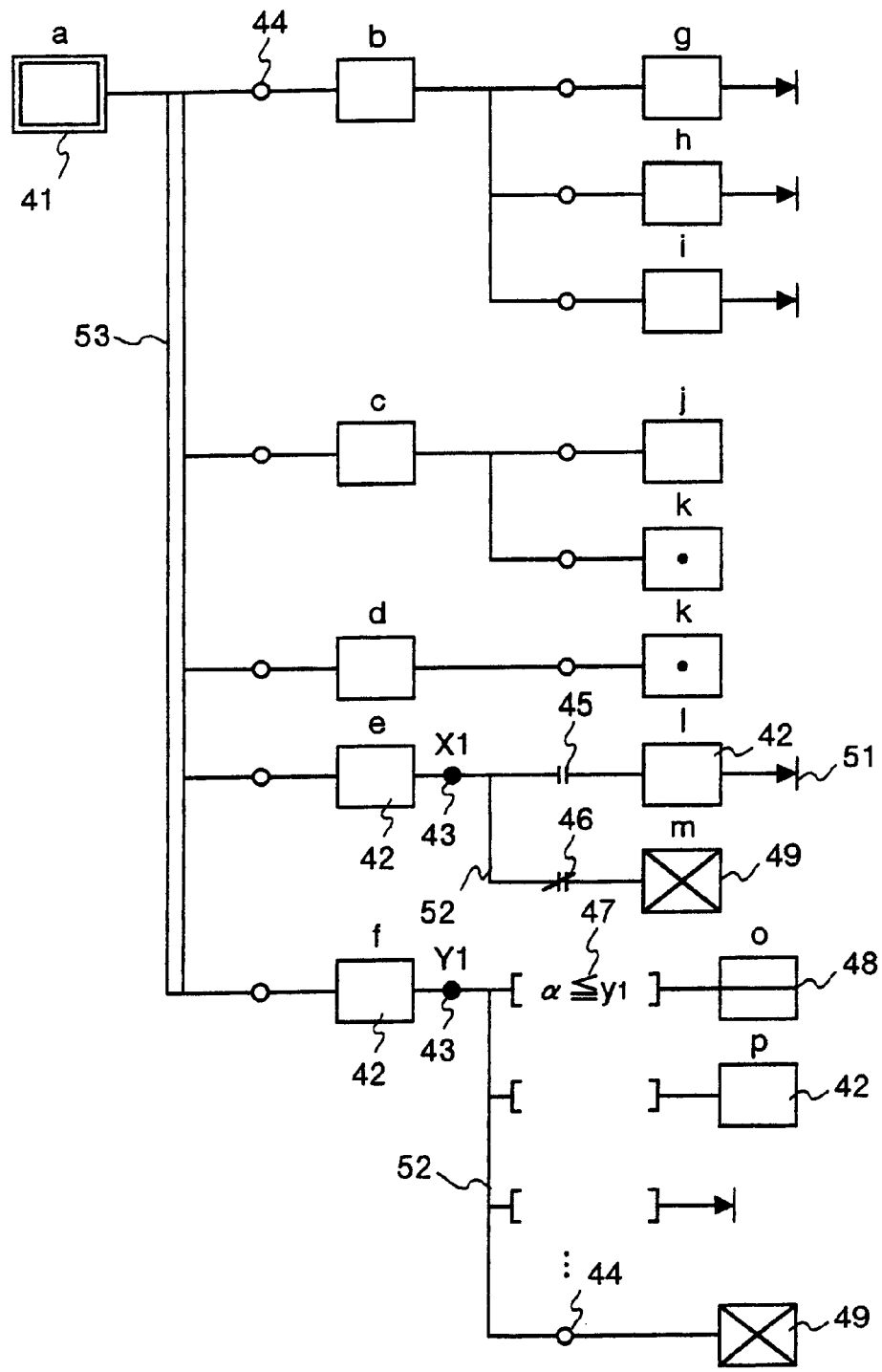
FIG. 17 is a view showing a fourth example of the screen shift chart.

FIG. 17 is a fourth screen shift chart created by using the above symbols. This screen shift chart is an example of a three-level structure in which the initial screen a is switched to five screen in the lower level (which correspond to the screen 'b', screen 'c', screen 'd', screen 'e', and screen 'f'), and these lower-level screens can be switched further to still lower-level screens (which correspond to the screen 'g', screen 'h', screen 'i', screen 'j', and screen 'k'). This screen shift chart indicates that the screens can unconditionally be switched to any of them by touching the touch switch.

More specifically, to start with, the identical level linking symbol 53 is connected to the symbol 41 as an initial screen 'a', then five of unconditional switching symbols 44 are connected to the identical level linking symbol 53. Further, the symbols 42 indicating screens 'b', 'c', 'd', 'e', and 'f' as targets for switching are connected to each of the symbols 44. Further, the identical level linking symbol 52 is connected to the symbol 42 indicating the screen 'b' as a target for switching, then three unconditional switching symbols 44 are connected to the symbol 52. Next, the symbols 42 indicating the screens 'g', 'h', and 'i' as targets for switching are connected to each of the symbol 44. Finally, a jump-to-highest-level symbol 51 is connected to each of the symbol 42. An identical level linking symbol 52 is also connected to the symbol 42 indicating the screen 'c' as a target for switching. Further, two unconditional switching symbols 44 are connected to the symbol 42. Finally, the symbols 42 and 50 indicating the screens 'j' and 'k' respectively as targets for switching are connected to the symbols 44 respectively. An unconditional switching symbol 44 is connected to the symbol 42 indicating the screen 'd' as a target for switching, and a symbol 50 indicating the screen 'k' as a target for switching is connected to this symbol 44. It should be noted that both the screens 'c' and 'd' are switched to the same screen 'k', therefore the screen 'k' as a target for switching is indicated by the symbol 50.

A condition switching symbol 43 is connected to the symbol 42 indicating the screen 'e' as a target for switching, a two-branch identical level linking symbol 52 is connected to this symbol 43. A contact-a symbol 45 and a contact-b symbol 46 are connected in parallel with each other and are connected to the symbol 52. A symbol 42 indicating the screen 'l' as a target for switching and the symbol 49 as a hold screen 'm' are connected to the symbols 45 and 46 respectively. Finally, a jump-to-highest-level symbol 51 is connected to the symbol 42. At this point, for instance, a signal X1 as a condition is set in the condition switching signal 26. This conditional signal X1 is bit data read-out from the signal information 13 of the control unit 5, and has an ON state or an OFF state. Therefore, two conditions can be allocated to each of the contact-a symbol 45 or the contact-b symbol 46. Herein, as the hold screen symbol 49 is connected to the contact-b symbol 46, if the condition is satisfied, the screen is not switched. It should be noted that, when the conditional switching is carried out by using the contact-a symbol 45 or the contact-b symbol 46, it is confirmed that both the screens as targets for switching connected thereto respectively are not the hold screen symbol 49. When both the screens have the hold screen symbol 49 it means that there is no screen as a target for switching.

The condition switching symbol 43 is connected to the symbol 42 indicating the screen 'f' as a target for switching and a four-branch identical level linking symbol 52 is connected to this symbol 43. A condition switching symbol 47 is connected to each of the three-branched targets, an unconditional switching symbol 44 is connected to the last one of the branched targets. An indirect screen symbol 48 indicating a screen 'o' as a target for switching, a symbol 42 indicating a screen 'p' as a target for switching, a jump-to-highest-level symbol 51 are connected to the three symbols 47 and a hold screen symbol 49 is connected to the symbol 44. For instance, a signal Y1 as a condition is set in the condition switching signal 26. This conditional signal Y1 is word data read-out from the data information 14 of the control unit 5, and as a switching condition, particular data can be set and a conditional expression with a specified range can be set therein. For example, a conditional expression $[\alpha \leq Y1]$ is allocated to one of the condition switching symbols 47 in FIG. 17, and if this condition is satisfied, the screen is switched to a screen corresponding to the conditional value.

In this case, as a switching screen identifier is different according to the conditional value, switching to a further lower level is not allowed when hierarchical screen switching is checked. Also lateral switching in the identical level using the indirect screen symbol 48 is not allowed. However, when the screen identifier of the screen to be switched by the indirect screen symbol 48 is explicitly pointed out by the symbol 42 indicating a screen as a target for switching on the screen shift chart, arrangement of an lower level is allowed but lateral switching is not allowed. As the indirect screen symbol 48 can be connected only to the condition switching symbol 47, the symbol has to be checked. Of the conditions set in the condition switching symbol 47 if a conditional value does not satisfy any of the conditions then it is expressed by using the unconditional switching symbol 44. Only one unconditional switching symbol 44 can be specified in the lower level of the condition switching symbol 43.

This screen shift chart (FIG. 14) is a chart in which, in addition to the screen shift chart of FIG. 14 where the switching to a screen in the higher level, switching to a screen in the identical level, and switching to a screen in the lower level are unconditionally made possible, a screen can further be switched to a screen when a specified condition is satisfied.

Herein, the screen shift editing section 32 of the screen editor according to the present invention generates screen switching information based on the fourth screen shift chart (FIG. 17), and controls to set the screen switching information for each screen ('a', 'b', 'c', 'd', 'e', 'f', 'g', 'h', 'i', 'j', and 'k', 'l', 'm', 'o', and 'p' in FIG. 17). In this case, the screen switching information is created and set in the order of the screen 'a' in the highest level first, then the screens 'b' to 'f' in the second level, and finally the screens 'g' to 'p' in the lowest level. As the setting of the screens 'a' to 'd' and screens 'g' to 'k' are the same as that in FIG. 8, FIG. 11 and FIG. 14 described above, description thereof is omitted herein. As for the setting of the screens 'e' and 'f', setting of a touch switch for switching a screen to the higher level and setting of a touch switch for switching a screen to any in the lateral level are the same as those of the screens 'e' and 'f' in FIG. 11 described above, so that description thereof is omitted herein.

Figure 18:
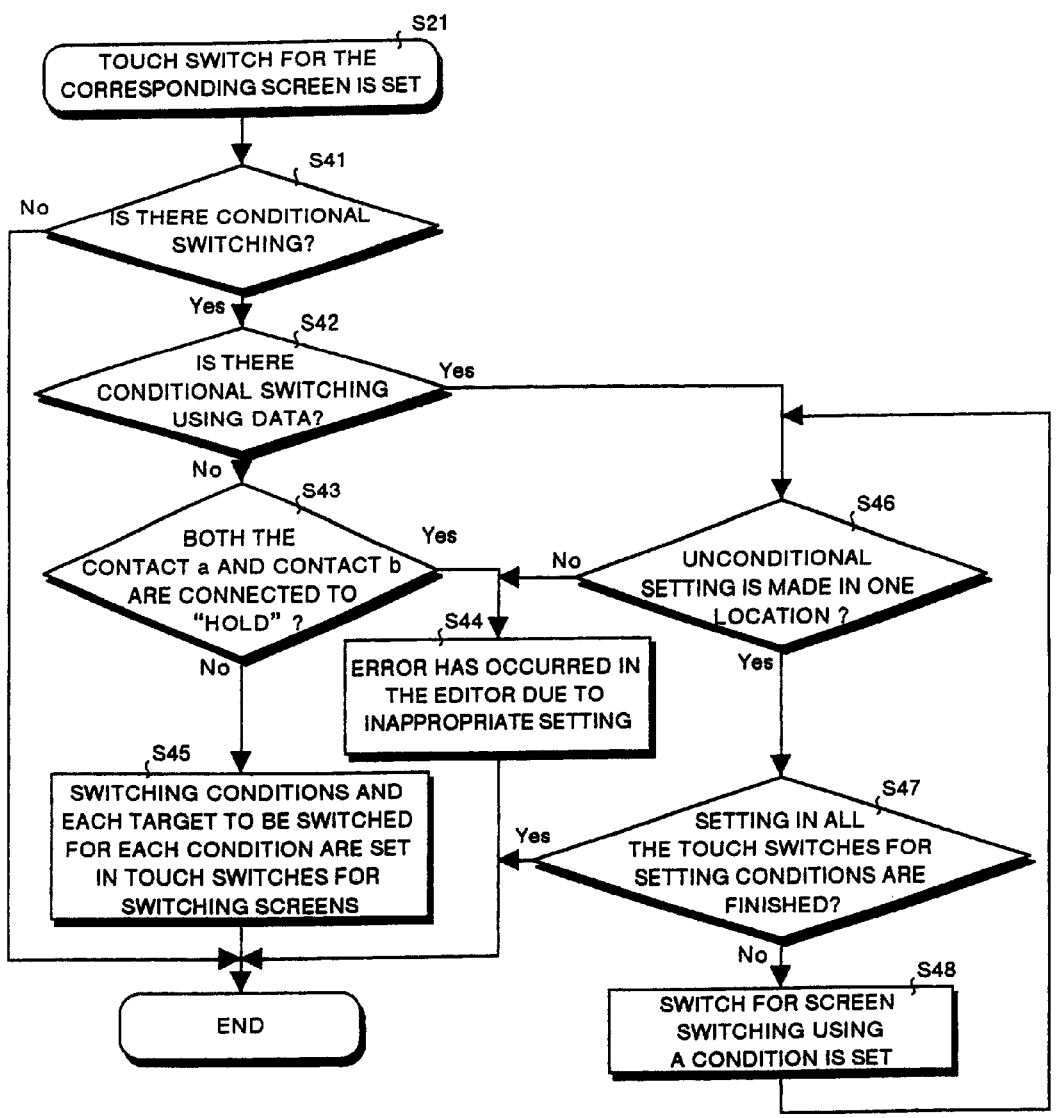
FIG. 18 is a flowchart of a process for setting of touch switches when conditions are set for switching of a screen.

Description hereinafter will be made using the FIG. 19 only for the sections that have not been described yet. FIG. 18 shows a flowchart of a process for setting of touch switches when conditions are set for the screen switching. The process in FIG. 18 is executed after the step S21 in FIG. 15.

In the screen 'e', after the setting of a touch switch for switching the screen to the screen 'a' in the higher level and setting of touch switches for switching the screen to the screens 'b' to 'f' each in the lateral level are ended (step S21 in FIG. 15), the screen shift editing section 32 checks whether the conditional switching is set in the screen 'e' or not (step S41). If it is determined that the condition is not set (No in step S41), the screen shift editing section 32 ends this setting.

Herein, as the switching condition is set (Yes in step S41), the screen shift editing section 32 checks then whether the condition is a switching condition by the signal information 13 (signal X1) or a switching condition by the data information 14 (signal Y1) (step S42). As the signal X1 is set in the screen 'e' as switching information (No in step S42), the screen shift editing section 32 checks then whether both the contact-a symbol 45 and contact-b symbol 46 are connected to the hold screen symbol 49 or not (step S43). When both the symbols are connected to a hold symbol (Yes in step S43), the screen shift editing section 32 issues a notice mentioning that an error has occurred because of inappropriate setting (S44), and ends this setting.

Herein, as only the contact-b symbol 46 is connected to the hold screen symbol 49 (No in step S43), the screen shift editing section 32 sets switching conditions for the contact-a as well as a screen identifier of a target screen for switching for each condition (step S45). It should be noted that "hold" is specified for the contact b, so that a screen identifier of a target screen for switching is not required to be set.

In the screen f, after the setting of a touch switch for switching the screen to the screen 'a' in the higher level and setting of touch switches for switching the screen to the screens 'b' to 'f' each in the lateral level are ended (step S21 in FIG. 15), the screen shift editing section 32 checks whether the conditional switching is set in the screen 'f' or not (step S41). If it is determined that the condition is not set (No in step S41), the screen shift editing section 32 ends this setting.

Herein, as the switching condition is set (Yes in step S41), the screen shift editing section 32 checks then whether the condition is a switching condition by the signal information 13 (signal X1) or a switching condition by the data information 14 (signal Y1) (step S42). As the signal Y1 is set in the screen 'f' as switching information (Yes in step S42), the screen shift editing section 32 checks then whether the setting of the symbol 44 is made at one location or not (step S46). When the symbol 44 is set in a plurality of locations (No in step S46), the screen shift editing section 32 issues a notice mentioning that an error has occurred because of inappropriate setting (step S44), and ends this setting.

Herein, as the symbol 44 is set in only one location (Yes in step S46), the screen shift editing section 32 checks whether screen identifiers as targets for switching for all the conditions are set in the touch switches for condition switching or not (step S47). If it is determined that the screen identifiers are not set (No in step S47), the screen shift editing section 32 sets the screen identifiers of a target screen for switching in the touch switch for condition switching (step S48), sets the screen identifiers as targets for switching for all the conditions (Yes in step S47), and ends this setting.

Figure 19:
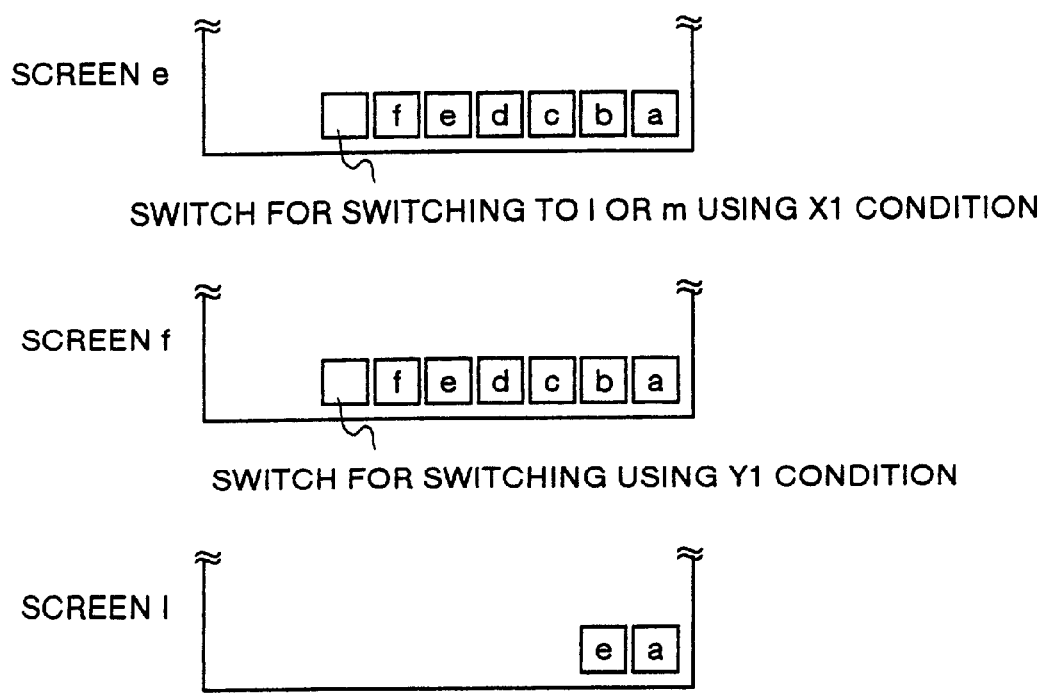
FIG. 19 is a view showing outlines of the screens edited and displayed according to FIG. 17.

FIG. 19 shows outlines of each screens edited and displayed by the setting of screen switching information performed based on the screen shift chart in FIG. 17. It should be noted that description of the same screens as those in FIG. 16 is omitted herein.

As shown in FIG. 19, in the screen 'e', a touch switch corresponding to the screen 'a' as a target for switching to the higher level, touch switches corresponding to the screens 'b' to 'f' as targets for switching to the lateral level, and a touch switch for screen switching to the screen 'l' or screen 'm' by means of the signal X1 are set. In the screen 'f', a touch switch corresponding to the screen 'a' as a target for switching to the higher level, touch switches corresponding to the screens 'b' to 'f' as targets for switching to the lateral level, and a touch switch for screen switching by means of the signal Y1 are set. In the screen 'l', a touch switch corresponding to the screen 'e' as a target for switching to the higher level screen and a touch switch corresponding to the initial screen 'a' are set.

In the screen 'e' of FIG. 19, switching to the screen 'l' or screen 'm' is decided based on the switching condition X1, so that only one touch switch is provided. For the same reason only one touch switch is provided in the screen 'f'.

As the setting for returning to the highest level is made in the screen 'l', a switch to the screen 'a' is set first, and then a touch switch for returning to the higher level to the screen 'e' is set. Because the screen 'm' is a hold screen symbol 49, an actual screen identifier is not allocated thereto. Because the screen 'o' is the indirect screen symbol 48, a screen identifier corresponding to a value of switching condition Y1 becomes the identifier of screen as a target for switching. As the screens 'o' and 'p' shift to screens based on the condition Y1, touch switches thereof do not exist therein respectively.

As described above, the following effects can be obtained by creating a screen shift chart and performing the processing on screen edits and display controls of the display unit by using the screen editor according to the present invention.

In the screen editor according to the present invention, the screen shift editing section 32 creates a screen shift chart through an operation specified by a person who wants to create a screen, further prepares screen switching information for shifting a screen according to this screen shift chart, and automatically sets a touch switch for selecting a screen to be switched (a screen displayable next) in each screen. With this feature, even if the amount of information as the screen switching information increases in association with an increase in the number of selectable (switchable) displayed screens, because the screen shift editing section 32 automatically sets information for each screen therein, the processing time being largely reduced. Further, since the hierarchical structure can easily be grasped from the screen shift chart, management of shifting of screens becomes easy even if the amount of information as the screen switching information increases.

The screen editor according to this invention creates a screen shift chart (documents) which contains a hierarchical structure in order to manage the shifting states of the screens, while the printing section 35 prints the created screen shift chart. With this feature, the time required for creating the screen shift chart can largely be reduced.

The screen editor according to this invention prepares screen information such as the screen switching information, and then transmits the prepared screen information through a line such as a communication line or the like. With this feature, the time required for setting the screen information for each screen therein can be reduced.

The screen editor according to this invention stores and manages the screen information data including the prepared screen switching information, the display information, and the switch information or the like in the data managing section 37. With this feature, the screen editor can easily respond to the processing required for retrieving the information, changing the displayed screen, and changing the target to be switched.

In the screen editor according to this invention, screen switching information can more easily be corrected, occurrence of an omission of correction or of improper correction can be reduced, and further the time required for creation of a screen shift chart and correction thereof can be reduced.

The screen editor according to this invention automatically sets, when a target screen to be switched of a screen is identical to that previously created and if resetting of the information does not generate the mismatch in the screen shift chart, the screen switching information for the screen. With this feature, the time and efforts for preparing the same screen switching information again can be omitted, and further the processing time can largely be reduced because the screen editing section 32 automatically sets the previously prepared screen switching information.

Description is made hereinafter for a method of creating a screen shift chart from the prepared screen information data by the screen editor according to the present invention.

Figure 20:
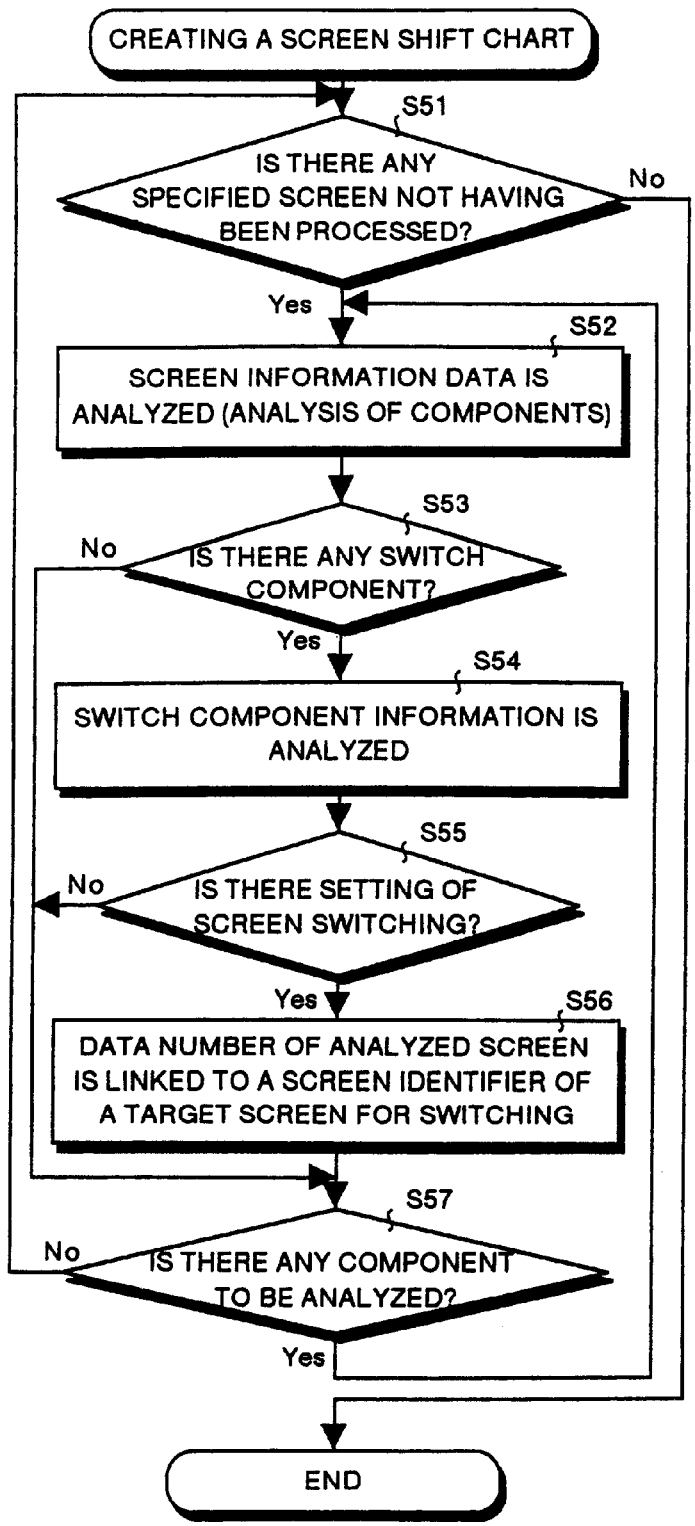
FIG. 20 is a flowchart of a process for creating the screen shift chart.

FIG. 20 is a flowchart of a process for creation of a screen shift chart. Description is made hereinafter for creation of a screen shift chart according to this flow chart.

In the screen editor according to the present invention, the screen details preparing section 33 or the data managing section 37 specifies all the screen identifier for which the operator wants to create a screen shift chart (e.g., the screens 'a', 'b', 'c' etc.).

The screen shift editing section 32 which receives all the specified screen identifiers determines whether there are any screen identifiers that have not been processed or not (Step S51 in FIG. 20). In this step, the result of the determination when starting has to be 'Yes'.

Figure 21:
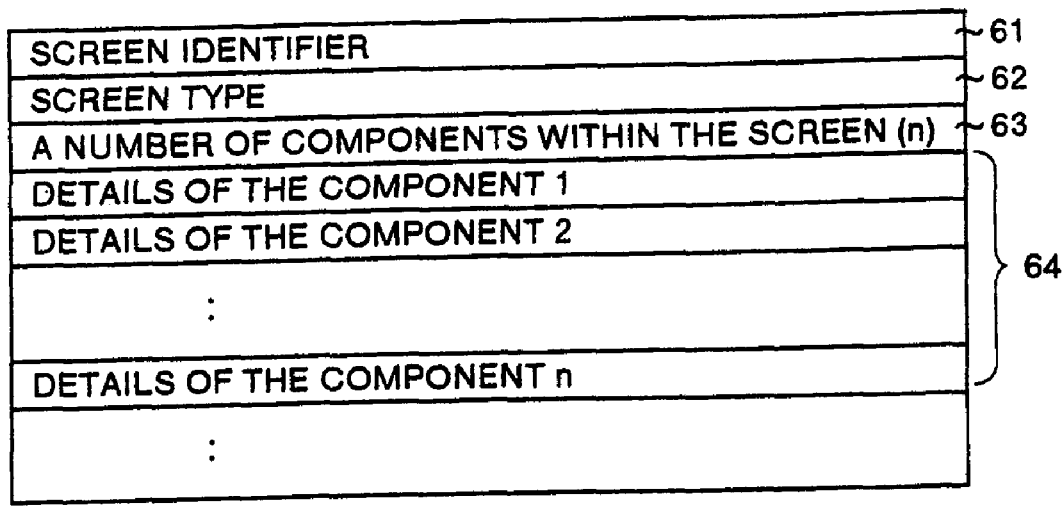
FIG. 21 is a view showing a structure of the screen information data.
Figure 22:
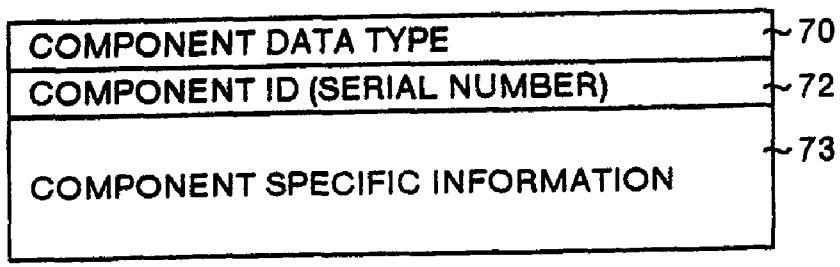
FIG. 22 is a view showing a structure of the detailed data.
Figure 23:
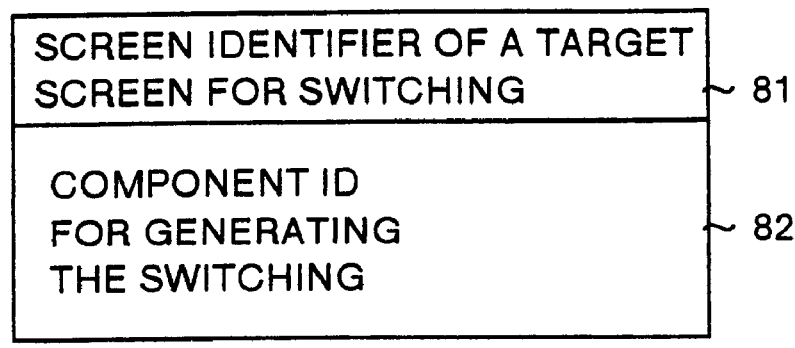
FIG. 23 is a view showing data for linking the screen number in processing to a target screen number to be switched.

Next, the screen shift editing section 32 selects one of all the specified screen identifiers and analyzes the screen information data for the screen corresponding to that screen identifier (step S52). This analysis is performed for each component. For example, screen information data for each screen consists of, as shown in FIG. 21, a screen identifier 61 for uniquely deciding each screen, a screen type 62 indicating the size of the screen and the function(s), a number of components (such as a switch, a lamp, or a graph) 63 within the screen, and data for details 64 such as a location and an attribute of each component, and is stored in the screen information memory 12 of the display unit 2 or in the data managing section 37 of the screen editor 31. It should be noted that the data for details 64 is stored by the pieces corresponding to the number of components 63 within the screen, and consists of, for instance, a component data type 71 indicating a type of component (such as a switch, a lamp, or a graph), a component ID 72 indicating a serial number of a component, and component specific information 73 as shown in FIG. 22.

As a result of analysis in step S52, the screen shift editing section 32 checks whether a target component is a switch component or not (step S53). If it is determined that the target component it is not a switch component (No in step S53), the processing is shifted to the next step where the component is analyzed. On the other hand, when it is determined that the target component is a switch component (Yes in step S53), the screen shift editing section 32 makes an analysis of the switch component (step S54). This analysis is carried out by referring to the switch information shown in FIG. 5.

Herein, for instance, if the screen identifier 24 as a target screen for switching is not set (No in step S55), the processing shifts to the next step where the component is analyzed, while if the screen identifier is set (Yes in step S55), the screen shift editing section 32 links the screen identifier currently being analyzed to the screen identifier 24 of a target screen for switching (step S56). The processing of linking the screen identifier currently being analyzed to the screen identifier 24 of a target screen for switching is carried out by holding a screen identifier 81 of a target screen for switching as the screen identifier 24 of a target screen for switching and a component ID 82 for generating the switching.

Then, the screen shift editing section 32 checks whether there are any other components to be analyzed in the screen currently being processed (step S57), and if it is determined that there are no components to be analyzed (Yes in step S57), performs analysis and linkage in the same manner as described above for the following components, and ends the analysis and linkage concerning this screen when there are left no components to be analyzed (No in step S57).

Then the same analysis and linkage as described above are carried out for all the previously specified screens in the screen details preparing section 33 or in the data managing section 37. At this stage, all the specified screens are linked to target screens for switching corresponding to those screens, and it becomes possible to create a screen shift chart.

As described above, the following effects can be obtained by creating a screen shift chart from the previously prepared screen information data by using the screen editor according to the present invention.

In the screen editor according to this invention, a screen shift chart is not created through an operation by a person but the screen shift editing section 32 automatically creates a screen shift chart by utilizing the previously prepared screen information. With this feature, the hierarchical structure of a displayed screen which does not have a screen shift chart can also be managed.

Description is made hereinafter for a method of automatically reflecting, when a screen shift chart is changed, the changed section or sections related to the changes to screen information data by using the screen editor according to the present invention.

Figure 24:
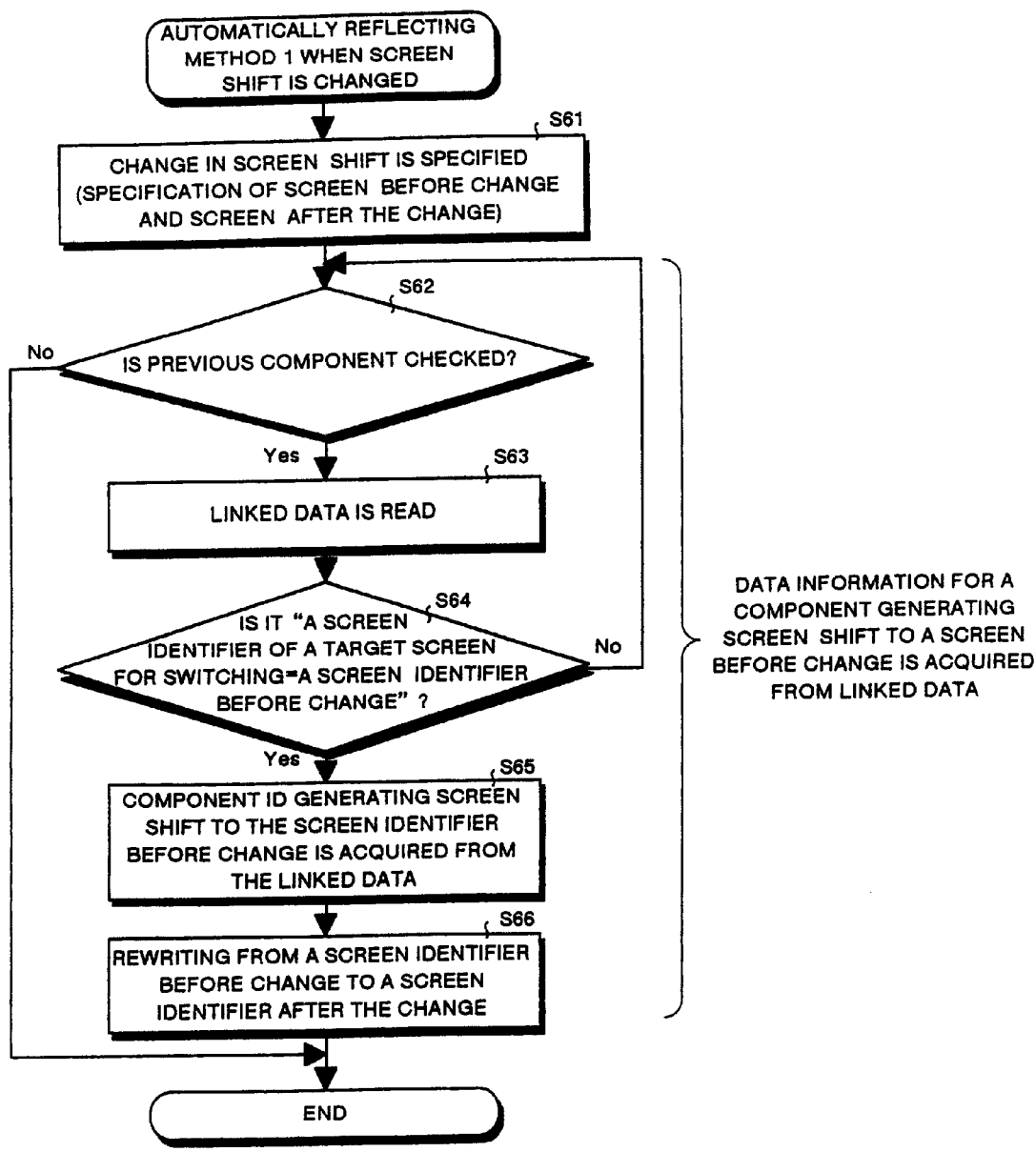
FIG. 24 is a flowchart of a process for automatically reflecting the information when the screen shift chart is changed.

FIG. 24 is a flowchart of a process of automatic reflection of the screen information data when the screen shift chart is changed. Description is made hereinafter for the processing of automatic reflection to screen information data when the screen shift chart is changed according to this flowchart.

Figures 25, 26:
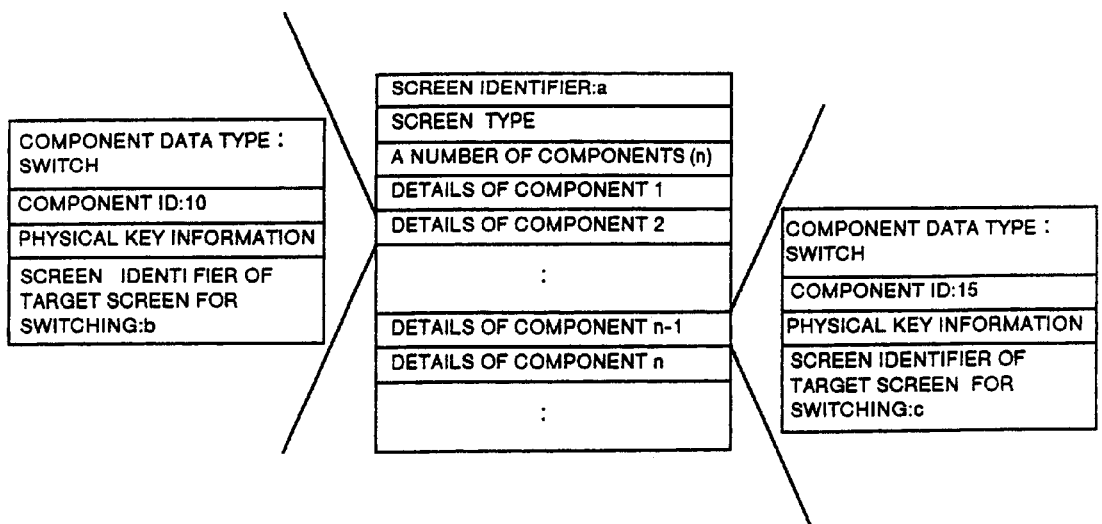
FIG. 25 is a view showing one example of the read-out linked data.
FIG. 26 is a view showing a more specific structure of the screen information data and the detailed data.

As changes in screen shifts in the screen editor, for instance, a shift from the screen identifier 'a' to the screen identifier 'b' is changed to a shift from the screen identifier 'a' to the screen identifier 'd' (step S61 in FIG. 24). At first, the screen shift editing section 32 determines whether there is any component not having been checked in the screen 'a' or not (step S62). In this step, the result of the determination when starting has to be 'Yes'. The screen shift editing section 32 reads out linked data on a switch corresponding to the target screen for switching set in the screen 'a' one by one in the ascending order of their ID numbers (step S63). FIG. 25 shows one example of the read-out linked data. It is clear from this example that the screen 'a' shifts to the screen 'b' or the screen 'c'.

Then, the screen shift editing section 32 checks whether the target screen for switching of the read-out linked data is the screen identifier 'b' that is one before the change or not (step S64). As the switch with a component ID of '10' shown in FIG. 25 has a screen identifier 'b' as a target screen for switching (Yes in step S64), the screen shift editing section 32 acquires this component ID (step S65). Thereafter, the screen shift editing section 32 reads out data for details of this switch from the details data within the screen information data according to this component ID, as shown in FIG. 26, and rewrites the screen identifier 'b' as a target screen for switching stored in the details data to the screen identifier 'd' (step S66).

As described above, the following effects can be obtained by performing the processing of automatic reflection when the screen shift chart is changed by using the screen editor according to the present invention.

The screen editor according to this invention automatically corrects, when an unwanted screen is deleted or when the target screen is changed or the like, screen information for all the related screens. With this feature, there is no need to correct the screen switching information set on all the related screens, occurrence of an omission of correction or of an improper correction can be eliminated, and further the time required for correction of the screen shift chart can be reduced.

INDUSTRIAL APPLICABILITY

As described above, the screen editor according to this invention is a useful function of a personal computer for editing of the screens and providing display control over a display unit which displays the screens while switching them. This screen editor is especially suitable for providing control over a display unit which is required to switch a large number of screens having a hierarchical structure.

What is claimed is:

1. A screen editor for creating screens in a display unit for switching the displayed screens through an operation from an input device; said screen editor comprising:

a screen editing unit for creating a screen shift chart in which a screen shift state is expressed in a hierarchical format and then automatically setting a screen switching information for each screen generated according to the screen shift chart; and a screen information preparing unit for preparing display information in details for each screen and component information concerning an input device; wherein said screen editing unit edits the screens and performs display control of the display unit according to the screen information including the screen switching information, the display information, and the component information.

2. A screen editor according to claim 1 further comprising a printing unit for printing and outputting the screen information.

3. A screen editor according to claim 1 further comprising a communicating unit for transmitting the screen information to a display unit through a communication line.

4. A screen editor according to claim 1 further comprising a screen information managing unit for managing the screen information.

5. A screen editor according to claim 1: wherein said screen editing unit has screen symbols with which conditions for switching the screens and the component information can be expressed, and said screen editing unit creates the screen shift chart using these screen symbols.

6. A screen editor according to claim 1: wherein said screen editing unit determines whether description in the created screen shift chart is generated according to the specification of a prespecified hierarchical structure or not, and issues a notice to that effect when it is determined that the description does not satisfy the specification.

7. A screen editor according to claim 1: wherein said screen editing unit confirms, when a previously created screen is specified again as a target screen to be switched thereto at the time of creating a screen shift chart, that there is no violation of the rules in the prespecified hierarchical structure, and then automatically sets the screen switching information for the screen.

* * * * *

UNITED STATES PATENT AND TRADEMARK OFFICE
CERTIFICATE OF CORRECTION

PATENT NO. : 6,407,758 B1
DATED : June 18, 2002
INVENTOR(S) : Tetsuyuki Usami and Narihiro Akatsuka It is certified that error appears in the above-identified patent and that said Letters Patent is hereby corrected as shown below:

<u>Column 20,</u>
Line 60, please add the following claims:
--      8. A screen editor according to Claim 1: wherein said screen editing unit automatically generates a screen shift chart by extracting the screen switching information from the previously prepared screen information and linking between screens according to the extracted information.
        9. A screen editor according to Claim 8: wherein said screen editing unit automatically reflects, when the screen shift chart is changed, the changed section and sections related to the change to the screen information. --

Signed and Sealed this

Twenty-ninth Day of October, 2002

*Attest:*

*Attesting Officer*

JAMES E. ROGAN
*Director of the United States Patent and Trademark Office*